(12) United States Patent
Moren

(10) Patent No.: US 6,479,602 B1
(45) Date of Patent: Nov. 12, 2002

(54) POLYMERIZATION INITIATOR SYSTEMS AND BONDING COMPOSITIONS COMPRISING VINYL AROMATIC COMPOUNDS

(75) Inventor: Dean M. Moren, North St. Paul, MN (US)

(73) Assignee: 3M Innovative Properties, St. Paul, MN (US)

( * ) Notice: Subject to any disclaimer, the term of this patent is extended or adjusted under 35 U.S.C. 154(b) by 0 days.

(21) Appl. No.: 09/525,368

(22) Filed: Mar. 15, 2000

(51) Int. Cl.[7] ................................................ C08F 4/52
(52) U.S. Cl. ...................... 526/196; 526/346; 526/328; 526/328.5; 502/103
(58) Field of Search ................. 526/346, 328, 526/328.5, 196; 502/103

(56) References Cited

U.S. PATENT DOCUMENTS

| | | | |
|---|---|---|---|
| 2,985,633 A | 5/1961 | Welch et al. ............. 260/85.3 |
| 3,050,505 A | 8/1962 | Litterio | |
| 3,141,862 A | 7/1964 | Kirshenbaum et al. .... 260/45.5 |
| 3,275,611 A | 9/1966 | Mottus et al. ............. 260/80.5 |
| 3,340,193 A | 9/1967 | Fields et al. .................. 252/56 |
| 3,418,260 A | 12/1968 | Trofimenko .................... 260/2 |
| 3,425,988 A | 2/1969 | German et al. ............... 260/47 |
| 3,451,952 A | 6/1969 | Slocombe ................... 260/2.5 |
| 3,476,727 A | 11/1969 | Lo Monaco et al. ....... 260/92.8 |
| 3,527,737 A | 9/1970 | Masuhara et al. ......... 260/78.5 |
| 3,725,504 A | 4/1973 | Owston | |
| 3,829,973 A | 8/1974 | Masuhara et al. ............. 32/15 |
| 3,832,274 A | 8/1974 | Owston | |
| 3,873,640 A | 3/1975 | Owston et al. | |
| 3,959,568 A | 5/1976 | Hill, Jr. et al. | |
| 4,167,616 A | 9/1979 | Bollinger .................... 526/197 |
| 4,379,728 A | 4/1983 | Lin ........................ 156/307.3 |
| 4,485,229 A | 11/1984 | Waddill et al. ............. 528/111 |
| 4,515,724 A | 5/1985 | Ritter ......................... 260/410 |
| 4,524,181 A | 6/1985 | Adam et al. ................ 525/107 |
| 4,538,920 A | 9/1985 | Drake | |
| 4,638,092 A | 1/1987 | Ritter ............................. 568/1 |
| 4,639,498 A | 1/1987 | Ritter ......................... 526/196 |
| 4,656,229 A | 4/1987 | Chiao ......................... 525/518 |
| 4,676,858 A | 6/1987 | Ritter ...................... 156/307.3 |
| 4,684,538 A | 8/1987 | Klemarczyk ............... 427/54.1 |
| 4,721,751 A | 1/1988 | Schappert et al. .......... 524/773 |
| 4,731,416 A | 3/1988 | Saunders ................... 525/131 |
| 4,775,734 A | 10/1988 | Goel ........................... 528/89 |
| 4,874,814 A | 10/1989 | Cartier et al. ................ 525/61 |
| 4,904,360 A | 2/1990 | Wilson, Jr. et al. ...... 204/181.7 |
| 4,920,188 A | 4/1990 | Sakashita et al. ........... 526/196 |
| 4,921,921 A | 5/1990 | Ritter ......................... 526/195 |
| 4,985,516 A | 1/1991 | Sakashita et al. ........... 526/196 |
| 5,021,507 A | 6/1991 | Stanley et al. .............. 525/127 |
| 5,082,147 A | 1/1992 | Jacobs | |
| 5,106,928 A | 4/1992 | Skoultchi et al. | |
| 5,143,884 A | 9/1992 | Skoulchi et al. ............ 502/160 |
| 5,286,821 A | 2/1994 | Skoultchi | |
| 5,310,835 A | 5/1994 | Skoultchi et al. | |
| 5,376,746 A | 12/1994 | Skoulchi ..................... 526/196 |
| 5,401,805 A * | 3/1995 | Chung et al. ............... 525/288 |
| 5,512,527 A | 4/1996 | Ritter ......................... 502/150 |
| 5,539,070 A | 7/1996 | Zharov et al. | |
| 5,599,622 A | 2/1997 | Kinzer et al. .......... 428/355 EP |
| 5,616,796 A | 4/1997 | Pocius et al. | |
| 5,621,143 A | 4/1997 | Pocius | |
| 5,681,910 A | 10/1997 | Pocius ........................ 526/198 |
| 5,684,102 A | 11/1997 | Pocius | |
| 5,686,544 A | 11/1997 | Pocius | |
| 5,690,780 A | 11/1997 | Zharov et al. | |
| 5,691,065 A | 11/1997 | Zharov et al. | |
| 5,712,331 A | 1/1998 | Ryang ........................ 523/400 |
| 5,718,977 A | 2/1998 | Pocius ........................ 428/422 |
| 5,795,657 A | 8/1998 | Pocius et al. | |
| 5,833,208 A | 11/1998 | Lee, Jr. | |
| 5,859,160 A | 1/1999 | Righettini et al. | |
| 5,872,197 A | 2/1999 | Deviny | |
| 5,935,711 A | 8/1999 | Pocius et al. | |
| 5,990,036 A * | 11/1999 | Devinyl ..................... 502/162 |
| 6,383,655 B1 * | 5/2002 | Moren ........................ 428/522 |

FOREIGN PATENT DOCUMENTS

| | | | |
|---|---|---|---|
| AU | 649582 | 10/1993 | .......... C09J/133/08 |
| CA | 664459 | 6/1963 | ................. 401/104 |
| CA | 2061021 | 10/1992 | .......... C09D/157/00 |
| EP | 0 051 796 | 10/1981 | .............. C09J/3/14 |
| EP | 0 167 223 | 1/1986 | .............. C09J/3/14 |
| EP | 0 268 985 A2 | 6/1988 | |
| EP | 0 435 173 A2 | 7/1991 | |
| EP | 0 040 079 A1 | 11/1991 | |
| EP | 0 511 464 A1 | 11/1992 | .............. C09J/4/00 |
| EP | 0 659 859 A1 | 6/1995 | .............. C09J/4/00 |
| GB | 904403 | 8/1962 | |
| GB | 988632 | 4/1965 | |
| GB | 1113722 | 5/1968 | |
| GB | 1132261 | 10/1968 | |
| JP | 42-14318 | 8/1967 | |

(List continued on next page.)

OTHER PUBLICATIONS

The Trialkylborane–initiated Graft Copolymerization of Methyl Methacrylate onto Hemoglobin, K. Kojima, S. Iwabuchi and K. Kojima, *Bulletin of the Chemical Society of Japan*, vol. 44, pp. 1891–1895 (1971).

(List continued on next page.)

*Primary Examiner*—David W. Wu
*Assistant Examiner*—William K Cheung
(74) *Attorney, Agent, or Firm*—Scott R. Pribnow

(57) ABSTRACT

Polymerization initiator systems comprising an organoborane and a vinyl aromatic compound are described. The polymerization initiator systems are particularly useful in formulating two-part curable bonding compositions, particularly those that cure to acrylic adhesives, more particularly those that cure to acrylic adhesives capable of bonding low surface energy substrates. Also described are bonding compositions comprising an organoborane, at least one polymerizable monomer, and at least one vinyl aromatic compound.

39 Claims, No Drawings

FOREIGN PATENT DOCUMENTS

| | | | |
|---|---|---|---|
| JP | 45-29195 | 9/1970 | |
| JP | 48-18928 | 6/1973 | ............ X09J/5/00 |
| WO | WO 93/23472 | 11/1993 | |
| WO | WO 97/07171 | 2/1997 | |
| WO | WO 97/17383 | 5/1997 | |
| WO | WO 98/12296 | 3/1998 | |
| WO | WO 98/17694 | 4/1998 | |
| WO | WO 98/30645 | 7/1998 | |
| WO | WO 99/64475 | 12/1999 | |
| WO | WO 99/64528 | 12/1999 | |
| WO | WO 00/56779 | 9/2000 | |

OTHER PUBLICATIONS

A New Method for the Graft Copolyermerization of Methyl Methacrylate onto Proteins and Fibers, *Polymer Letters*, vol. 9, pp. 25–29 (1971).

The Grafting of Methyl Methacrylate onto Cotton by Tri–*n*–butylborane, K. Kojima, S. Iwabuchi, K. Murakami, K. Kojima and F. Ichikawa, *Journal of Applied Polymer Science*, vol. 16, pp. 1139–1148 (1972).

Grafting of Vinyl Monomers By Tri–*n*–Butylborane onto Chlorophyll and Related Compounds, *Polymer Letters Edition*, vol. 13, pp. 361–363 (1975).

Tributylborane–Initiated Grafting of Methyl Methacrylate onto Chitin, K. Kojima, M. Yoshikuni and T. Suzuki, *Journal of Applied Polymer Science*, vol. 24, pp. 1587–1593 (1979).

Grafting of Methyl Methacrylate onto Silk Fibers Initiated by Tri–*n*–Butylborane, M. Tsukada, T. Yamamoto, N. Nakabayashi, H. Ishikawa and G. Freddi, *Journal of Applied Polymer Science*, vol. 43, pp. 2115–2121 (1991).

Molecular Weight Distribution of the Methyl Methacrylate (MMA) Polymer Separated from the MMA–Grafted Silk Fiber, M. Tsukada, Y. Goto, G. Freddi, T. Yamamoto and N. Nakabayashi, *Journal of Applied Polymer Science*, vol. 44, pp. 2197–2202 (1992).

Synthesis of Functionalized Polypropylene and Polypropylene–Polymethylmethacrylate Graft Copolymer, D. Rhubright and T. C. Chung, Proceedings of the American Chemical Society, *Polymeric Materials Science and Engineering*, vol. 67, pp. 112–113 (1992).

Polymerization of Acrylonitrile in Presence of Tributylborine, G. Kolesnikov and L. Fedorova, translated from *Bull. Acad. Sci. USSR, Div. Chem. Sci.*, p. 236 (1957).

Tributylborine: A Catalyst for the Polyermization of Unsaturated Compounds, G. Kolesnikov and N. V. Klimentova, translated from *Bull. Acad. Sci. USSR, Div. Chem. Sci.*, p. 666 (1957).

Triethylboron as an Initiator for Vinyl Polymerization, J. Furukawa, T. Tsuruta and S. Inoue, *Journal of Polymer Science*, vol. XXVI, Issue No. 113, pp. 234–236 (1957).

Oxygen Compounds as Cocatalyst for Triethylboron–Catalyzed Vinyl Polymerization, J. Furukawa and T. Tsuruta, *Journal of Polymer Science*, vol. XXVIII, Issue No. 116, pp. 227–229 (1958).

Mechanism of the Polymerization of Acrylonitrile in Presence of Tributylborine, G. Kolesnikov and L. Fedorova, translated from *Bull. Acad. Sci. USSR, Div. Chem. Sci.*, p. 906 (1958).

Mechanism of Trialkylboron Initiated Polymerization, J. Fordham and C. Sturm, *Journal of Polymer Science*, vol. XXXIII, No. 126, pp. 503–504 (1958).

Cocatalytic Activity of Some Metal Salts on Vinyl Polymerization with Tributhylboron, I. M. Panayotov, *Comptes rendus de l'Academie bulgare des Sciences*, vol. 14, No. 2, pp. 147–150 (1961).

Polymerization with Organoboron Compounds, F. Arimoto, *Journal of Polymer Science: Part A–1*, vol. 4, pp. 275–282 (1966).

On the Existence of a Free–Radical Organoboron Complex in the Polymerization of Methyl Methacrylate, R. Kern and J. Schaefer, *Polymer Letters*, vol. 5, pp. 157–162 (1967).

Vinyl Monomer Polymerization Mechanism in the Presence of Trialkylboranes, J. Grotewold, E. Lissi and A. Villa, *Journal of Polymer Science: Part A–1*, vol. 6, pp. 3157–3162 (1968).

Free–Radical Polymerization of Methyl Methacrylate in the Presence of Trialkylboranes, P. Brindley and R. Pearson, *Polymer Letters*, vol. 6, pp. 831–835 (1968).

Ethylene Polymerization in Presence of Tributylboron, G. Kolesnikov and T. Soboleva, *Scientific and Research Publications of the Members of the All Union Chemical Society Name After Mendilev*, vol. 2, p. 663 (1957).

Studies on Dental Self–Curing Resins (II), S. Fujisawa, Y. Imai and E. Masuhara, *Reports of the Institute for Medical & Dental Engineering*, vol. 3, pp. 64–71 (1969).

Free–Radical Copolymerization of 1,2–Dichloroethylenes. Evidence for Chain Transfer by Chlorine Atom Elimination, T. Dawson, R. Lundberg and F. Welch, *Journal of Polymer Science: Part A–1*, vol. 7, pp. 173–181 (1969).

Mechanism of Vinyl Monomer Polymerization in the Presence of Trialkylboranes and Inhibitors, E. Aranchibia et al., *Journal of Polymer Science: Part A–1*, vol. 7, pp. 3430–3433 (1969).

Polymerization of Methyl Methacrylate by Trialkylborane–Pyridine System, K. Kojima et al., *Polymer Letters*, vol. 8, pp. 541–547 (1970).

Polymerization Initiated by Triethylborane–Peroxide Mixtures, E. Abuin et al., *Polymer Letters*, vol. 7, pp. 515–518 (1970).

Polymerization of Methyl Methacrylate by Co–ordination Compounds of Tri–*n*–butylborane with Some Electron–donating Compounds, Kojima et al., *Research Report of the Chiba University Faculty of Engineering*, vol. 22, No. 41, pp. 47–55. (English Abstract).

Polymerization of Methyl Methacrylate Initiated by Tri–*n*–butylborane–Organic Halide Systems, M. Yoshikuni, M. Asami, S. Iwabuchi and K. Kojima, *Journal of Polymer Science*, vol. 11. pp. 3115–3124 (1973).

Polymerization of Methyl Methacrylate Initiated by Tributylborane–Pyridine System, Kojima et al., *Journal of the Japanese Chemical Society*, No. 11. pp. 2165–2171 (1972). (English Abstract).

The Copolymerization of Vinylhydroquinone and Acrylonitrile by Tri–*n*–butylborane, S. Iwabuchi, M. Ueda,M. Kobayashi and K. Kojima, *Polymer Journal*, vol. 6, No. 2, pp. 185–190 (1974).

Free Radical Polymerization in the Presence of Triethylborane, E. Abuin, J. Cornejo and E. Lissi, *European Polymer Journal*, vol. 11, pp. 779–782 (1975).

Polymerization of Methyl Methacrylate by tri–n–butylborane in the presence of amino acid esters, K. Kojima, S. Iwabuchi, Y. Moriya and M. Yoshikuni, *Polymer*, vol. 16, pp. 601–604 (1975).

Analysis of Mechanism of Radical Formation Resulted from the Initiator System of Triethylboron and Oxygen by Spin Trapping Technique, Sato et al., *Journal of the Japanese Chemical Society*, No. 6, pp. 1080–1084 (1975). (English Abstract).

Development of Adhesive Pit and Fissure Sealants Using a MMA Resin Initiated by a Tri–n–butyl Borane Derivative, N. Nakabayashi and E. Masuhara, *Journal of Biomedical Materials Research*, vol. 12, pp. 149–165 (1978).

Vinyl Acetate Polymerization Initiated by Alkylborane–oxidizer–type Systems, S. Ivanchev, L. Shumnyi and V. Konovalenko, *Polymer Science U.S.S.R.*, vol. 22, No. 12, pp. 3000–3006 (1980).

Preparation of Hard Tissue Compatible Materials: Dental Polymers, N. Nakabayashi and E. Masuhara, *Biomedical Polymers*, pp. 85–111 (1980).

Mechanism of Initiation of Polymerization of Vinyl Monomers by Means of the Trialkylborane–Acid System, S. Ivanchev and L. Shumnyi, translated from Doklady Akademii Nauk SSSR, vol. 270, No.5, pp. 1127–1129 (1983).

Effect of Organic Bases on Initiating Properties in the System Boronalkylelemental Organic Peroixde During Vinylchloride Polymerization, T. Guzanova, Master Thesis of the Fifth (graduate) year student, Ministry of High and Secondary Special Education Russia, Gorky State University (1983).

Application of Spin Trapping Technique to Radical Polymerization, 20, T. Sato, N. Fukumura and T. Otsu, Makromol. Chem., 184, pp. 431–442 (1983).

Importance of Polymerization Initiator Systems and Interfacial Initiation of Polymerization in Adhesive Bonding of Resin to Dentin, Y. Imai, Y. Kadoma, K. Kojima, T. Akimoto, K. Ikakura T. Ohta, *J. Dent. Res.*, vol. 70, No. 7, pp. 1088–1091 (1991).

Vibrational Analysis by Raman Spectroscopy of the Interface Between Dental Adhesive Resin and Dentin, M. Suzuki, H. Kato and S. Wakumoto, *J. Dent. Res.*, vol. 70, No. 7, pp. 1092–1097 (1991).

Laser–Raman Spectroscopic Study of the Adhesive Interface Between 4–MET/MMA–TBB Resin and Hydroxyapatite or Bovine Enamel, M. Ozaki, M. Suzuki, K. Itoh and S. Wakumoto, *Dental Materials Journal*, vol. 10, No. 2, pp. 105–120 (1991).

Polymerization of Some Vinyl Monomers on Triisobutylboron–Containing Radical Initiators in the Presence of Hydroquinone and Benzoquinone, V. Dodonov and D. Grishin, *High Molecular Compounds,* vol. 35, No. 3, pp. 137–141 (1993). (English Abstract).

Synthesis of PP–g–PMMA, PP–g–PVA and PP–g–PCL Copolymers, D. Rhubright and T. Chung, American Chemical Society, Division of Polymer Chemistry, Papers Presented at the Chicago, Illinois Meeting, vol. 34, No. 2, pp. 560–561 (1993).

Functionalized and Grafted Polyolefin Copolymers Prepared by Tansition Metal Catalysts and Borane Monomers, T. Chung, *Polymer Reprints*, vol. 35, No. 1, pp. 674–675 (1994).

Photochemical Modification of Fluorocargon Resin Surface to Adhere with Epoxy Resin, M. Okoshi, T. Miyokawa, H. Kashiura and M. Murahara, *Mat. Res. Soc. Symp. Proc.*, vol. 334, pp. 365–371 (1994).

Chemical Abstract No. 88532r, *Chemical Abstracts*, vol. 73, 1970.

Chemical Abstract No. 134385q, *Chemical Abstracts*, vol. 80, 1974.

"Adhesion Problems at Polymer Surfaces", D.M. Brewis, *Progress in Rubber and Plastic Technology*, vol. 1, No. 4, pp. 1–21 (1985).

"The Use of Adhesives in the Joining of Plastics", *Treatis on Adhesion and Adhesives*, vol. 7, pp. 333–435, (1991).

*Hydroboranes*, pp. 55–56 (1962).

Nöth, H. et al., "$^{11}$B–und $^{14}$N–Kernresonanzstudien an tetrakoordinierten Bor–Strickstoff–Verbindungen," *Chem. Ber.*, 107 pp. 3070–3088 (1974).

*Polyurethanes: Chemistry and Technology*, vol. XVI, Part I, J.H. Saunders, pp. 160–173 (1962).

Fujisawa, Imai, and Mashuhara, *Reports of the Institute for Medical and Dental Engineering*, vol. 3, p. 64 (1969).

\* cited by examiner

POLYMERIZATION INITIATOR SYSTEMS AND BONDING COMPOSITIONS COMPRISING VINYL AROMATIC COMPOUNDS

BACKGROUND

An efficient, effective means for adhesively bonding low surface energy substrates such as polyethylene, polypropylene and polytetrafluoroethylene (e.g., TEFLON) has long been sought. The difficulties in adhesively bonding these materials are well known. See, for example, "Adhesion Problems at Polymer Surfaces" by D. M. Brewis that appeared in Progress in Rubber and Plastic Technology, volume 1, page 1 (1985).

The conventional approaches often use complex and costly substrate surface preparation techniques such as flame treatment, corona discharge, plasma treatment, oxidation by ozone or oxidizing acids and sputter etching. Alternatively, the substrate surface may be primed by coating it with a high surface energy material. However, to achieve adequate adhesion of the primer, it may be necessary to first use the surface preparation techniques described above. All of these techniques are well known, as reported in Treatis on Adhesion and Adhesives (J. D. Minford, editor, Marcel Dekker, 1991, New York, volume 7, pages 333–435). The known approaches are frequently customized for use with specific substrates. As a result, they may not be useful for bonding low surface energy substrates generally.

Moreover, the complexity and cost of the presently known approaches do not render them particularly suitable for use by the retail consumer (e.g., home repairs, do-it-yourselfers, etc.) or in low volume operations. One persistent problem is the repair of many inexpensive common household articles that are made of polyethylene, polypropylene or polystyrene such as trash baskets, laundry baskets and toys.

A series of patents issued to Zharov et al. (U.S. Pat. Nos. 5,539,070, 5,690,780 and 5,691,065) report a polymerizable acrylic bonding composition that comprises at least one acrylic monomer, an effective amount of certain organoborane amine complexes, and an effective amount of an acid for initiating polymerization of the acrylic monomer. The acrylic composition is especially useful as an acrylic adhesive for bonding low surface energy polymers.

Another series of patents issued to Pocius et al. (U.S. Pat. Nos. 5,616,796, 5,684,102 and 5,795,657) report polymerizable acrylic bonding compositions that comprise acrylic monomer, organoborane polyamine complex and a material reactive with amine. Polymerizable acrylic monomer compositions useful as adhesives for bonding low surface energy polymers can be prepared. The polyamine is the reaction product of a diprimary amine-terminated material, and a material having at least two groups reactive with a primary amine.

With increasingly demanding end-user requirements, bonding composition formulators are constantly being challenged to improve both application performance (e.g., worklife, rate of strength increase and cure time) and physical property performance (e.g., T-peel strength) of bonding compositions. It is very often times the case that a formulation change that enhances one property of a bonding composition deleteriously affects a second property of the bonding composition. Because of this, the formulator may have to accept less than a desirable balance between the competing properties. For this reason, adhesive formulators are constantly seeking new materials that provide a more favorable overall balance of properties in bonding compositions.

In many industrial and consumer applications for bonding compositions a long worklife is highly desirable feature. Worklife refers to the maximum time period available for bringing the bonding composition into contact with the substrate(s) to be bonded (i.e., closing the bond) after the initiation of the cure of the bonding composition. If the substrates are brought into contact with the bonding composition after the worklife has expired, the ultimate strength of the bond formed between the substrates may be compromised.

Several techniques have been reported for increasing the worklife of bonding compositions. In one known technique, worklife is increased by slowing the cure rate of the bonding composition, for example, by reducing the amount of polymerization initiator in the bonding composition and/or the chemical reactivity of the initiator. This technique, however, may typically lengthen the overall cure time and may slow the rate of strength increase of the bonding composition. The addition of certain polymerizable monomers to bonding compositions has also been reported to increase worklife. U.S. Pat. No. 5,859,160 (Righettini et al.) reports a free radical curable composition, useful as a two part adhesive, that includes a free radical curable compound and a vinyl aromatic compound that is chemically different than the free radical curable compound. The vinyl aromatic compound is present in an amount that is reportedly sufficient to decelerate the cure rate of the free radical composition without adversely effecting completion of cure and the properties of the curable composition after it has cured. In general, the amount of vinyl aromatic compound is less than 5 weight percent, preferably less than 2 weight percent, based on the total weight of the part of the composition that includes the free radical curable component. Although the above reported techniques may be used to increase the worklife of bonding compositions, other properties of the bonding composition such as rate of strength increase, cure time and T-peel strength may be sacrificed as a result of the increased worklife.

In addition to the foregoing, when formulating two-part bonding compositions it is very often desirable to formulate the parts such that they can be mixed with one another in a convenient mix ratio, for example, 1:1, 1:4, 1:10, and the like. To this end, materials are desired that may be added to one or more of the parts of the bonding composition to modify the mix ratio, wherein the addition of the materials does not deleteriously affect the performance characteristics and storage stability of the resulting bonding composition.

SUMMARY

In one embodiment, the present invention provides polymerization initiator systems that are particularly useful in providing two-part curable bonding compositions, particularly those that cure (i.e., polymerize) to acrylic adhesives, more particularly those that cure to acrylic adhesives capable of bonding low surface energy substrates. The polymerization initiator systems of the present invention may be conveniently used to formulate two-part bonding compositions having a convenient whole number mix ratio. In addition, the polymerization initiator systems of the present invention enable the formulation of bonding compositions having a long worklife without substantially affecting other important properties such as rate of strength increase, cure time and T-peel strength. In preferred embodiments, the worklife of the bonding composition is increased and the T-peel strength of the cured bonding composition is also increased. Broadly, the polymerization initiator systems include an organoborane and at least one vinyl aromatic compound according to general formula (1) or general formula (2):

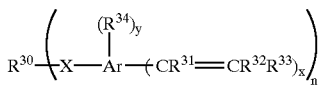  (1)

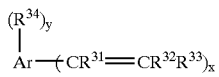  (2)

In formula (1), n represents an integer having a value of 1 or greater, preferably 2 or greater. In formula (1) and formula (2), Ar represents a substituted aryl group. Examples of Ar include a substituted benzene group or a substituted napthalene group. Most preferably, Ar is a substituted benzene group.

In formula (1) and (2), subscript x, which represents an integer having a value of 1 or greater, represents the number of unsaturated groups bonded to each Ar group in the vinyl aromatic compound.

In formulas (1) and (2), $R^{31}$, $R^{32}$ and $R^{33}$ are independently selected from the group consisting of hydrogen, alkyl, aryl and halogen. Preferably, $R^{31}$ is selected from the group consisting of hydrogen and methyl and $R^{32}$ and $R^{33}$ are hydrogen.

In formulas (1) and (2), $R^{34}$ represents a non-hydrogen substituent bonded to the aryl group (Ar). Subscript y is an integer having a value of 0 or greater which represents the number of individual substituents bonded to the aryl group Ar. When y is equal to 1 or greater, each substituent $R^{34}$ may be independently selected from the group consisting of alkyl, alkoxy, alkanoyl, alkanoyloxy, aryloxy, aroyl, aroyloxy and halogen. Preferably, y is equal to 0 in formula (1).

In formula (1), X represents either a divalent organic linking group or a covalent bond. In a preferred embodiment, X is a divalent organic linking group comprising a urethane or a urea functional group.

In formula (1), $R^{30}$ represents an organic group, preferably an oligomeric or polymeric organic group. The molecular weight of the ($R^{30}-X_n$) group is about 100 or greater, more preferably about 200 or greater, and most preferably about 500 or greater. Representative examples of polymeric organic groups include hydrocarbon polymers (e.g., polyethylene, polystyrene, polypropylene, and polymethylpentene), carbon chain polymers (e.g., polyvinyl chloride, polyvinylidene chloride, and polyacrylonitrile), heterochain polymers (e.g., polyethers, polyamides, polyesters, polyurethanes, polysulfides, polysulfone, and polyimide).

The organoborane may be represented by the following general formula:

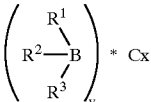

where $R^1$ is an alkyl group having 1 to about 10 carbon atoms. $R^2$ and $R^3$ may be the same or different and are independently selected from alkyl groups having 1 to about 10 carbon atoms and phenyl-containing groups. Preferred organoborane initiators are complexed with a complexing agent and may be represented by the following general formula:

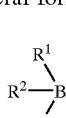

wherein $R^1$, $R^2$ and $R^3$ are as described above, Cx is a complexing agent and v represent the ratio of complexing agent to boron atoms. Useful complexing agents (Cx) include, for example, amines, amidines, hydroxides and/or alkoxides.

The present invention is not limited, however, to bonding compositions prepared using the polymerization initiator systems of the present invention. Rather, the present invention broadly provides bonding compositions comprising an organoborane initiator, a polymerizable monomer and a vinyl aromatic compound, regardless of whether the vinyl aromatic compound is combined with the organoborane, the polymerizable monomer or both to form the bonding composition. Accordingly, another embodiment of the present invention provides bonding compositions comprising an organoborane, at least one polymerizable monomer, and at least one vinyl aromatic compound according to general formula (1) or (2) or a mixture thereof. The bonding compositions of the present invention may be used to bond a wide variety of substrates, but provide exceptionally good adhesion to low surface energy plastic substrates (e.g., polyethylene, polypropylene, polytetrafluoroethylene, etc.). Suitable polymerizable monomers include (meth)acrylates, for example, (meth)acrylic esters of monohydric alcohols and (meth)acrylic acid esters of polyhydric alcohols, acid amides, and mixtures thereof.

The bonding compositions of the present invention are typically and preferably provided in a two-part form wherein the initiator component is kept separate from the polymerizable monomer component. The two-parts are combined prior to application of the bonding composition to the substrate. Accordingly, in another embodiment, the present invention provides two-part curable bonding compositions comprising (a) a first part comprising an organoborane and (b) a second part comprising a polymerizable monomer. At least one of the first part or the second part further includes a vinyl aromatic compound according to general formula (1) or general formula (2). In a preferred embodiment, the vinyl aromatic compound is mixed with the organoborane to provide a polymerization initiator system of the present invention.

As used herein, the following terms have the following meanings.

The term "low surface energy substrates" are those substrates that have a surface energy of less than 45 mJ/m², more typically less than 40 mJ/m² or less than 35 mJ/m². Representative examples of low surface energy substrates include polyethylene, polypropylene and polytetrafluoroethylene.

The terms "monovalent organic group" and "multivalent organic group" mean an organic moiety. Monovalent organic groups have one available valency and multivalent organic groups have more than one available valency.

The term "organic group" can be an aliphatic group or a cyclic group. In the context of the present invention, the term "aliphatic group" means a saturated or unsaturated, linear or branched, hydrocarbon. This term is used to encompass, for example, alkyl, alkylene, alkenyl, alkenylene, alkynyl and alkynylene groups.

The term "alkyl" means a monovalent, saturated, linear or branched, hydrocarbon group (e.g., a methyl, ethyl, isopropyl, t-butyl, heptyl, dodecyl, octadecyl, amyl, or 2-ethylhexyl group, and the like). The term "alkylene" means a multivalent, saturated, linear or branched hydrocarbon group.

The term "alkenyl" means a monovalent, linear or branched, hydrocarbon group with one or more carbon-carbon double bonds (e.g., a vinyl group).

The term "alkenylene" means a multivalent, linear or branched, hydrocarbon group with one or more carbon-carbon double bonds.

The term "alkynyl" means a monovalent, linear or branched, hydrocarbon group with one or more carbon-carbon triple bonds.

The term "alkynylene" means a multivalent, linear or branched, hydrocarbon group with one or more carbon-carbon triple bonds.

The term "cyclic group" means a closed ring hydrocarbon group that is classified as an alicyclic group, aromatic group, or heterocyclic group.

The term "alicyclic group" means a cyclic hydrocarbon group having properties resembling those of aliphatic groups.

The term "aromatic group" or "aryl -group" means a mononuclear aromatic hydrocarbon group or polynuclear aromatic hydrocarbon group.

The terms "organic group" or "organic linking group" may include, in addition to carbon and hydrogen, atoms of oxygen, nitrogen or sulfur which may be present, for example in the form of organic functional groups such as ethers, esters, amides, amines, aldehydes, ketones, carboxylic acids or carbonyls.

The term "alkoxy" means an alkyl group bonded to an oxygen atom (i.e. an alkyl ether).

The term "alkanoyl" means an alkyl group bonded to a carbonyl group (i.e. an alkyl ketone).

The term "alkanoyloxy" means an alkyl group bonded to a carbonyl group which is itself bonded to an oxygen atom, (i.e. an alkyl ester).

The term "aryloxy" means an aryl group bonded to an oxygen atom (i.e. an aryl ether).

The term "aroyl" means an aryl group bonded to a carbonyl group (i.e. an aryl ketone).

The term "aroyloxy" means an aryl group bonded to a carbonyl group which is itself bonded to an oxygen atom (i.e. an alkyl ester).

DETAILED DESCRIPTION OF THE PREFERRED EMBODIMENTS

The present invention provides polymerization initiator systems that are particularly useful in providing two-part curable bonding compositions, especially those that cure (i.e., polymerize) to acrylic adhesives.

In one aspect of the invention, the polymerization initiator systems include an organoborane and at least one vinyl aromatic compound. The vinyl aromatic compound is advantageously both a carrier (extender) for the organoborane initiator and reactive with other components (e.g., polymerizable monomers) of the bonding composition. If the organoborane initiator is complexed, for example with an amine, a decomplexer which is preferably kept separate from the organoborane initiator until cure of the bonding composition is also necessary.

The polymerization initiator systems can be directly combined with polymerizable monomers for a two-part bonding composition in a convenient, commercially useful, whole number mix ratio of 1:10 or less. Moreover, and quite advantageously, the vinyl aromatic compound is reactive with the polymerizable monomers and can copolymerize therewith. Thus, in addition to providing a carrier or extender for the organoborane, the vinyl aromatic compound becomes incorporated into the polymerized bonding composition.

The individual components of the initiator systems and bonding compositions of the present invention are described below in detail below.

Organoborane

The organoborane initiates free-radical copolymerization of the polymerizable monomer and vinyl aromatic compound to form a polymer that can be useful as an bonding composition, for example an acrylic adhesive. The organoborane initiator may be represented by the following general formula:

where $R^1$ is an alkyl group having 1 to about 10 carbon atoms. $R^2$ and $R^3$ may be the same or different and are independently selected from alkyl groups having 1 to about 10 carbon atoms and phenyl-containing groups. Preferably, $R^1$, $R^2$ and $R^3$ are independently selected from alkyl groups having 1 to about 5 carbon atoms. Accordingly, $R^1$, $R^2$ and $R^3$ may all be different, or more than one of $R^1$, $R^2$ and $R^3$ may be the same. Together, $R^1$, $R^2$ and $R^3$, along with the boron atom (B) to which they are attached, form the initiator. Specific organoborane initiators include, for example, trimethylborane, triethylborane, tri-n-propylborane, triisopropylborane, tri-n-butylborane, triisobutylborane, and tri-sec-butylborane.

Preferred organoborane initiators are complexed with a complexing agent and may be represented by the following general formula:

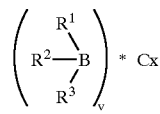

wherein $R^1$, $R^2$ and $R^3$ are as described above and wherein Cx is a complexing agent.

Complexing Agents

Useful complexing agents (Cx) include, for example, amines, amidines, hydroxides and/or alkoxides. The ratio of complexing agent (Cx) to boron atoms in the complex is represented by "v" and is preferably selected so as to provide an effective ratio of the complexing agent and boron atoms. The complexing agent to boron atom ratio in the complex is preferably about 1:1. A complexing agent to boron atom ratio of less than 1:1 could leave free organoborane, a material that tends to be pyrophoric.

Amine Complexing Agents

Amine complexing agents (Cx) may be provided by a wide variety of materials having at least one amine group, including blends of different amines. Amine complexing agents may also be polyamines (i.e., materials having two or more amine groups such as two to four amine groups).

In one embodiment the amine complexing agent may be a primary or secondary monoamine, such as those represented by the structure:

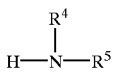

wherein R$^4$ and R$^5$ are independently selected from the group consisting of hydrogen, alkyl groups having 1 to 10 carbon atoms, alkylaryl groups in which the amine group is not directly attached to the aryl structure, and polyoxyalkylene groups. Particular examples of these amines include ammonia, ethylamine, butylamine, hexylamine, octylamine, benzylamine, and polyoxyalkylene monoamines (e.g., JEFFAMINES from Huntsman Chemical Company, such as M715 and M2005).

In another embodiment, the amine may be a polyamine such as those described by the structure:

R$^5$HN—R$^6$—NHR$^5$ wherein R$^5$ is as defined above and wherein R$^6$ is a divalent, organic radical comprised of an alkyl, aryl or alkylaryl group. Preferred among these materials are alkane diamines which may be branched or linear, and having the general structure

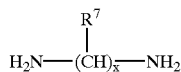

in which x is a whole number greater than or equal to 1, more preferably about 2 to 12, and R$^7$ is hydrogen or an alkyl group. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes for the invention may be selected from the following structures:

H$_2$NR$^8$(R$^9$O)$_w$—(R$^{10}$O)$_x$—(R$^9$O)$_y$—R$^8$NH$_2$ (i.e., polyoxyalkylene diamines); or

[H$_2$NR$^8$—(R$^9$O)$_w$]$_z$—R$^{11}$.

R$^8$, R$^9$ and R$^{10}$ are alkylene groups having 1 to 10 carbon atoms and may be the same or may be different. Preferably, R$^8$ is an alkylene group having 2 to 4 carbon atoms such as ethylene, n-propylene, iso-propylene, n-butylene or iso-butylene. Preferably, R$^9$ and R$^{10}$ are alkylene groups having 2 or 3 carbon atoms such as ethylene, n-propylene or iso-propylene. R$^{11}$ is the residue of a polyol used to prepare the polyoxyalkylenepolyamine (i.e., the organic structure that remains if the hydroxyl groups are removed). R$^{11}$ may be branched or linear, and substituted or unsubstituted (although substituents should not interfere with oxyalkylation reactions).

The value of w is $\geq 1$, more preferably about 1 to 150, and most preferably about 1 to 20. Structures in which w is 2, 3 or 4 are useful too. The value of x and y are both $\geq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature ("room temperature" refers to, herein, a temperature of about 20 to 22° C.) as this simplifies handling and mixing thereof. Usually, the polyoxyalkylenepolyamine is itself a liquid. For the polyoxyalkylenepolyamine, molecular weights of less than about 5,000 may be used, although molecular weights of about 1,000 or less are more preferred, and molecular weights of about 140 to 1,000 are most preferred.

Examples of particularly preferred polyoxyalkylenepolyamines include polyethyleneoxidediamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, and poly(ethyleneoxide-co-propyleneoxide)triamine.

Examples of suitable commercially available polyoxyalkylenepolyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

As reported in U.S. Pat. No. 5,616,796 (Pocius et al.), the disclosure of which is incorporated herein by reference, the polyamine may also comprise the condensation reaction product of diprimary amine-terminated material (i.e., the two terminal groups are primary amine) and one or more materials containing at least two groups reactive with primary amine.

Hydroxide/Alkoxide Complexing Agents

Hydroxide and/or alkoxide complexing agents (Cx) are reported in copending application having U.S. Ser. No. 09/433,476 (Moren), filed Nov. 4, 1999 pending the disclosure of which is incorporated herein by reference. Preferred hydroxide and/or alkoxide complexing agents may be represented by the formula:

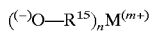

wherein:

R$^{15}$ is independently selected from hydrogen or an organic group (e.g., alkyl or alkylene group);

M$^{(m+)}$ represents a countercation (e.g., sodium, potassium, tetraalkylammonium, or combinations thereof);

n is an integer greater than zero; and m is an integer greater than zero.

Amidine Complexing Agents

Amidine complexing agents may be represented by the formula:

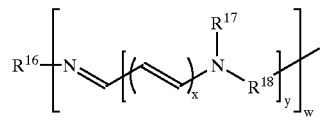

wherein:

R$^{16}$ is hydrogen or an organic group, preferably hydrogen or an alkyl or alkylene group;

R$^{17}$ and R$^{18}$ are independently a monovalent organic group or part of a cyclic structure; and w, x, and y comprise integers, preferably w being 1 and x being about 3 or less.

Particularly preferred amidine complexing agents comprise those selected from the group consisting of N,N,N', N'-tetramethylguanidine; 1,8-diazabicyclo[5.4.0]undec-7-ene; 1,5-diazabicyclo[4.3.0]non-5-ene; 2-methylimidazole; 2-methylimidazoline; and 4-(N,N-dimethylamino)-pyridine.

An organoborane complex may be readily prepared using known techniques. Typically, the complexing agent is combined with the organoborane in an inert atmosphere (e.g., a glovebox flushed with nitrogen to an environment having less than 100 ppm oxygen) with slow stirring. The organoborane can be added from a pressure equalizing dropping funnel to a flask into which the coupling agent has been previously weighed. An exotherm is often observed and cooling of the mixture is, therefore, recommended. Addition of the organoborane may be moderated to control the exotherm. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. A crystalline mass of the complex can be heated (e.g., to about 55° C.) with an oil bath and outside of the nitrogen environment to liquify the complex and facilitate its transfer to the storage vial, which can be flushed with nitrogen.

The organoborane is employed in an effective amount, which is an amount large enough to permit acrylic monomer polymerization to readily occur to obtain an acrylic polymer of high enough molecular weight for the desired end use. If the amount of organoborane is too low, then the polymerization may be incomplete or, in the case of adhesives, the resulting composition may have poor adhesion. On the other hand, if the amount of organoborane is too high, then the polymerization may proceed too rapidly to allow for effective mixing and use of the resulting composition.

Large amounts of organoborane could potentially weaken the bond formed by a bonding composition of the present invention. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane is an amount that preferably provides about 0.003 to 1.5%-wt. boron, more preferably about 0.008 to 0.5%-wt. boron, most preferably about 0.01 to 0.3%-wt. boron. The %-wt. of boron in a composition is based on the total weight of the composition, less fillers, non-reactive diluents, and other non-reactive materials. Thus, the polymerizable monomers, the vinyl aromatic compound, and organic thickener, (e.g., poly(methyl methacrylate) or core-shell polymer), if present, are included, but ingredients lacking abstractable hydrogen atoms or unsaturation are not. The %-wt. of boron in the composition may be calculated by the following equation:

$$\frac{\text{(weight of organoborane in the composition)} \times \text{(\%-wt. of boron in the organoborane)}}{\text{(Total weight of the composition less non-reactive components)}}$$

Quite advantageously, the organoborane is carried by (e.g., dissolved in or diluted by) a vinyl aromatic compound or a blend of two or more different vinyl aromatic compounds. The vinyl aromatic compound should not be reactive toward the complexing agent and functions as an extender for the organoborane.

The vinyl aromatic compound should be soluble in acrylic monomers included in the bonding composition. By "soluble" it is meant that no evidence of gross phase separation at room temperature is visible to the unaided eye. Similarly, the organoborane should be soluble in the vinyl aromatic compound, although slightly warming a mixture of the organoborane and the vinyl aromatic compound may be helpful in forming a solution of the two at room temperature. Preferably the vinyl aromatic compound is a liquid at or near room temperature (i.e., within about 10° C. of 20–22° C.) or forms a liquid solution with the organoborane at or near room temperature. Higher viscosity vinyl aromatic compounds may also be useful. Compounds having a Brookfield viscosity of up to about 1,000,000 cp at 22° C. may be successfully employed, although materials with a viscosity of about 100,000 cp or less are more preferred.

The utility of vinyl aromatic compounds as carriers or extenders in the present invention is enhanced by employing materials that show little or no volatility at room temperature (no appreciable or readily measurable change in volume after 6 months storage at room temperature). Such materials generally have a boiling point in excess of about 160° C., more preferably in excess of about 190° C., and most preferably greater than about 210° C.

The vinyl aromatic compounds impart excellent storage stability and an extended shelf-life to initiation systems and polymerizable compositions made therewith. That is, the initiator system and polymerizable compositions remain stable at room temperature for an extended period of time. Thus, special storage conditions such as refrigeration can be avoided without substantially sacrificing the storage life of the product.

Quite advantageously, substantial amounts (e.g., up to 50% by weight) of the organoborane may be dissolved in the vinyl aromatic compound, which facilitates the provision of two-part adhesives that can be combined in a commercially useful mix ratio. The vinyl aromatic compound also functions as a reactive extender because the ethylenic unsaturation enables this material to free-radically copolymerize with acrylic monomers. Advantageously, this yields a fully (i.e., 100%) reactive system, sometimes referred to herein as a 100% solids system. Desirably, this can reduce the level of low molecular weight migratory components in the polymerizable composition which, in the case of an adhesive, could bloom to the surface of a bonded interface and reduce the strength of the adhesive bond.

Decomplexer

When complexed organoborane initiators are used as the organoborane initiator in a bonding compositions of the present invention, the bonding compositions further comprise a decomplexer. The term "decomplexer" as used herein refers to a compound capable of liberating the initiator (e.g., organoborane) from its complexing agent, thereby enabling initiation of the polymerizable monomer of the bonding composition. Decomplexers may also be referred to as "activators" or "liberators" and these terms may be used synonymously herein.

When the organoborane is complexed with an amine, a suitable decomplexer is an amine reactive compound. The amine reactive compound liberates organoborane by reacting with the amine, thereby removing the organoborane from chemical attachment with the amine. A wide variety of materials may be used to provide the amine reactive compound including combinations of different materials. Desirable amine reactive compounds are those materials that can readily form reaction products with amines at or below room temperature (about 20° to 22° C.) so as to provide a composition such as an adhesive that can be easily used and cured under ambient conditions. General classes of useful amine reactive compounds include acids, anhydrides and aldehydes. Isocyanate, acid chloride, sulfonyl chloride, and the like such as isophorone diisocyanate, toluene diisocyanate and methacryloyl chloride may also be used.

Any acid that can liberate the organoborane by salting the amine group may be employed. Useful acids include Lewis acids (e.g., $SnCl_4$, $TiCl_4$ and the like) and Bronsted acids (e.g., carboxylic acids, HCl, $H_2SO_4$, $H_3PO_4$, phosphonic acid, phosphinic acid, silicic acid, and the like). Useful carboxylic acids include those having the general formula $R^{20}$—COOH, where $R^{20}$ is hydrogen, an alkyl group of 1 to 8 and preferably 1 to 4 carbon atoms, or an aryl group of 6 to 10, preferably 6 to 8 carbon atoms. The alkyl groups may comprise a straight chain or they may be branched. They may be saturated or unsaturated. The aryl groups may contain substituents such as alkyl, alkoxy or halogen moieties. Illustrative acids of this type include acrylic acid, methacrylic acid, acetic acid, benzoic acid, and p-methoxybenzoic acid.

If it is desirable to provide a polymerizable composition that has less odor, an alkenyl group having a larger number of carbon atoms is recommended. In this event, $R^{20}$ may be a straight or branched chain, saturated or unsaturated alkenyl group of at least 9 carbon atoms, more preferably at least about 11 carbon atoms, and most preferably at least about 15 carbon atoms.

Other carboxylic acids useful as the amine reactive compound include dicarboxylic acids and carboxylic acid esters. Such compounds may be represented by the following general structure:

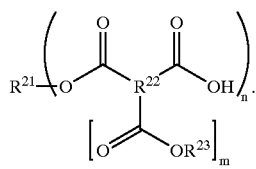

$R^{21}$ is hydrogen, a monovalent organic group (preferably having about 18 atoms or less, more preferably about 8 atoms or less), or a multivalent organic group (preferably having about 30 atoms or less, more preferably about 10 atoms or less). $R^{22}$ is multi-valent organic group (preferably having about 8 atoms or less, more preferably about 4 atoms or less). $R^{23}$ is hydrogen or a monovalent organic group (preferably having about 18 atoms or less, more preferably about 8 atoms or less). The integral value of "m" is 0, 1 or 2, and the integral value of "n" is greater than or equal to one, preferably 1 to 4, more preferably 1 or 2.

More preferably m is 0 so as to yield carboxylic acids represented by the following general structure:

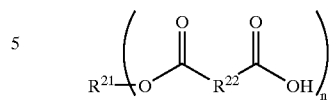

wherein $R^{21}$, $R^{22}$, and n are as previously defined.

The "organic groups" referred to in conjunction with $R^{21}$, $R^{22}$ and $R^{23}$ may be an aliphatic group (which may be saturated or unsaturated, and linear or branched), a cycloaliphatic group, an aromatic group, or an oxygen-, nitrogen-, or sulfur- containing heterocyclic group. When $R^{21}$ is hydrogen, m is zero, and n is one, the resulting compounds are dicarboxylic acids, useful examples of which include: oxalic acid; malonic acid; succinic acid; glutaric acid; adipic acid; maleic acid; fumaric acid; phthalic acid; isophthalic acid; and terephthalic acid. When, $R^{21}$ is an aliphatic group, n is one, and m is zero, the resulting compounds are carboxylic acid esters, useful examples of which include: 1,2-ethylene bismaleate; 1,2-propylene bismaleate; 2,2'-diethyleneglycol bismaleate; 2,2'-dipropyleneglycol bismaleate; and trimethylolpropane trismaleate.

Also preferred as the amine reactive compound are materials having at least one anhydride group, such materials preferably having one of the following structures:

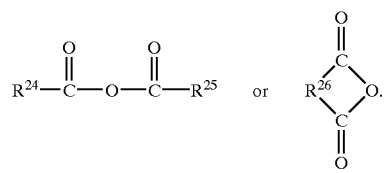

$R^{24}$ and $R^{25}$ are organic radicals which independently may be aliphatic (including straight- and branched-chain arrangements that may be saturated or unsaturated), cycloaliphatic, or aromatic. Preferred aliphatic groups comprise 1 to 17 carbon atoms, more preferably 2 to 9 carbon atoms. Preferred aromatic groups include benzene which may be substituted with 1 to 4 carbon atom aliphatic groups.

$R^{26}$ is a divalent organic radical that completes a cyclic structure with the anhydride group to form, for example, a 5- or 6-membered ring. $R^{26}$ may be substituted with aliphatic, cycloaliphatic or aromatic groups, preferably aliphatic groups comprising 1 to 12, more preferably 1 to 4 carbon atoms. $R^{26}$ may also contain heteroatoms such as oxygen or nitrogen provided that any heteroatom is not adjacent to the anhydride functionality. $R^{26}$ may also be part of a cycloaliphatic or aromatic fused ring structure, either of which may be optionally substituted with aliphatic groups. The presence of a free-radically polymerizable group in the anhydride-functional amine reactive compound may permit the same to polymerize with the acrylic monomers.

Aldehydes useful as the amine-reactive compound have the formula:

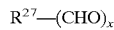

where $R^{27}$ is a monovalent organic radical, such as is an alkyl group of 1 to 10 carbon atoms (preferably 1 to 4), or an aryl group having 6 to 10 carbon atoms (preferably 6 to 8), and x is 1 or 2 (preferably 1). In this formula, the alkyl groups may be straight or branch-chained, and may contain substituents such as halogen, hydroxy and alkoxy. The aryl groups may contain substituents such as halogen, hydroxy, alkoxy, alkyl and nitro. The preferred $R^{27}$ group is aryl. Illustrative examples of compounds of this type include, benzaldehyde, o-, m- and p-nitrobenzaldehyde, 2,4-dichlorobenzaldehyde, p-tolylaldehyde and 3-methoxy-4 hydroxybenzaldehyde. Blocked aldehydes such as acetals may also be used in this invention.

The decomplexer is employed in an effective amount (i.e., an amount effective to promote polymerization by liberating the initiator from its complexing agent, but without materially adversely affecting desired properties of the ultimate polymerized composition). As recognizable to one of ordinary skill in the art, too much of the decomplexer may cause polymerization to proceed too quickly and, in the case of adhesives, the resulting materials may demonstrate inadequate adhesion to low energy surfaces. However, if too little decomplexer is used, the rate of polymerization may be too slow and the resulting polymers may not be of adequate molecular weight for certain applications. A reduced amount of decomplexer may be helpful in slowing the rate of polymerization if it is otherwise too fast. Thus, within these parameters, the decomplexer is typically provided in an amount such that the ratio of amine-, amidine-, hydroxide- or alkoxide-reactive groups in the decomplexer(s) to amine, amidine, hydroxide or alkoxide groups in the complexing agent(s) is in the range of 0.5:1.0 to 3.0:1.0. For better performance, preferably the ratio of amine-, amidine-, hydroxide- or alkoxide-reactive groups in the decomplexer (s) to amine, amidine, hydroxide or alkoxide groups in the complexing agent(s) is in the range of 0.5:1.0 to 1.0:1.0, preferably about 1.0:1.0.

Vinyl Aromatic Compounds

A "vinyl aromatic compound" refers to an organic compound according to general formula (1) or general formula (2) or a mixture thereof:

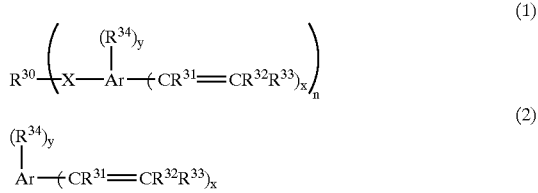

In formula (1), n represents an integer having a value of 1 or greater, preferably 2 or greater. In formula (1) and formula (2), Ar represents a substituted aryl group, preferably having from 6–10 carbon atoms. Examples of Ar include a substituted benzene group having the formula $C_6H_{5-x-y}$ for formula (1) or $C_6H_{6-x-y}$ for formula (2) or a substituted napthalene group having the formula $C_{10}H_{7-x-y}$ for formula (1) or $C_{10}H_{8-x-y}$ for formula (2). Most preferably, Ar is a substituted benzene group.

In the vinyl aromatic compounds of formulas (1) and (2), the $—CR^{31}=CR^{32}R^{33}$ group provides a site of unsaturation (i.e., a double bond) which is reactive with the polymerizable monomer of the bonding composition. That is, the vinyl aromatic compound copolymerizes with the polymerizable monomer and becomes chemically attached to the polymerizable monomer. In formula (1) and (2), subscript x, which represents an integer having a value of 1 or greater, represents the number of unsaturated moieties bonded to each Ar group in the vinyl aromatic compound. In a preferred embodiment of formula (1), x is 1.

In formulas (1) and (2), $R^{31}$, $R^{32}$ and $R^{33}$ are independently selected from the group consisting of hydrogen, alkyl, aryl and halogen. Preferably, $R^{31}$ is selected from the group consisting of hydrogen and methyl and $R^{32}$ and $R^{33}$ are hydrogen. To avoid gelling, it is generally preferred that vinyl aromatic compounds of formulas (1) and (2) having $R^{31}$=H, are packaged separate from the organoborane (e.g., included only in part B) in two part bonding compositions of the present invention.

In formulas (1) and (2), $R^{34}$ represents a non-hydrogen substituent bonded to the aryl group Ar. Subscript y is an integer having a value of 0 or greater which represents the number of individual substituents bonded to the aryl group Ar. When y is equal to 1 or greater, each substituent $R^{34}$ may be independently selected from the group consisting of alkyl, alkoxy, alkanoyl, alkanoyloxy, aryloxy, aroyl, aroyloxy and halogen. Preferably, y is equal to 0 in formula (1).

In formula (1), X represents either a divalent organic linking group or a covalent bond. In a preferred embodiment, X is a divalent organic linking group comprising a urethane or a urea functional group. In a more preferred embodiment, X is:

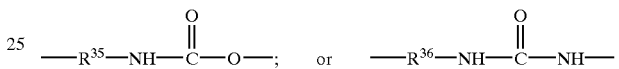

wherein $R^{35}$ and $R^{36}$ are divalent organic linking groups having from 1–10 carbon atoms. If present, $R^{35}$ and $R^{36}$ are bonded to the aryl group (Ar) of formula (1).

In formula (1), $R^{30}$ represents an organic group, preferably an oligomeric or polymeric organic group. The molecular weight of $R^{30}—X_n$ is 100 or greater, more preferably 200 or greater, and most preferably 500 or greater. Representative examples of polymeric organic groups include hydrocarbon polymers (e.g., polyethylene, polystyrene, polypropylene, and polymethylpentene), carbon chain polymers (e.g., polyvinyl chloride, polyvinylidene chloride, and polyacrylonitrile), heterochain polymers (e.g., polyethers, polyamides, polyesters, polyurethanes, polysulfides, polysulfone, and polyimide). Suitable polymeric organic groups may be homopolymers or copolymers, for example, copolymers and terpolymers and may be alternating, random, block, or graft in structure. Preferred organic groups $R^{30}$ include polyesters (e.g., polycaprolactone) having a molecular weight ranging from about 300–1000 (grams/mole) and polyethers having a molecular weight ranging from about 500–3000 (grams/mole).

Preferred monofunctional vinyl aromatic compounds of formula (1) are represented below in general formula (1A) wherein, with reference to formula (1), Ar is a benzene ring, y is 0, $R^{31}$ is methyl, $R^{32}$ and $R^{33}$ are hydrogen, x is 1, and n is 1. The bonding structure to the benzene ring is shown generally and may be ortho, meta or para.

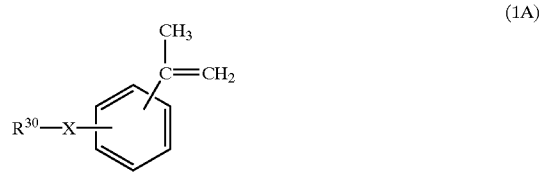

Representative examples of monofunctional vinyl aromatic compounds of formula (1A) include:

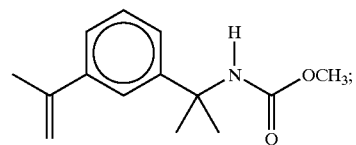

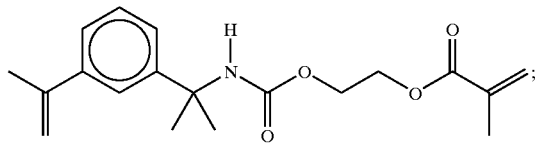

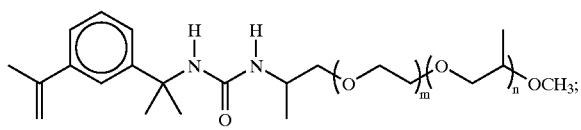

wherein m typically ranges from about 0 to 50; and n typically ranges from about 0 to 48.
In one embodiment, for example, m is equal to 6 and n is equal to 38.

Preferred difunctional vinyl aromatic compounds of formula (1) are represented below in general formula (1B) wherein, with reference to formula (1), Ar is a benzene ring, y is 0, $R^{31}$ is methyl, $R^{32}$ and $R^{33}$ are hydrogen, x is 1, and n is 2. The bonding structure to the benzene rings is shown generally and may be independently on each ring ortho, meta or para.

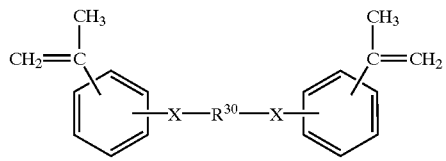

Representative examples of difunctional vinyl aromatic compounds of formula (1B) include:

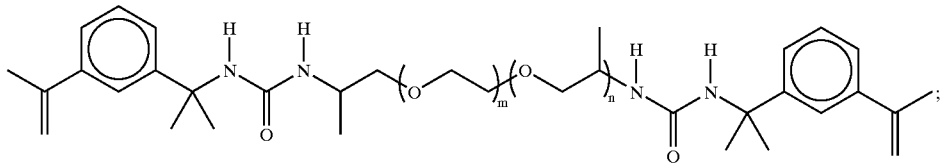

wherein m typically ranges from about 0 to 50; and n typically ranges from about 0 to 50;

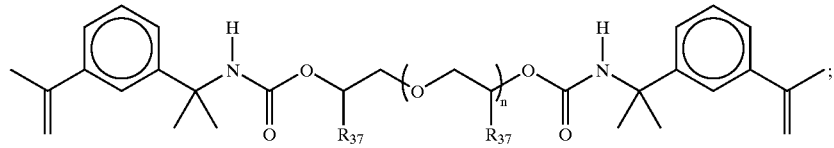

wherein n typically ranges from about 0 to 140; and $R_{37}$ is methyl or hydrogen.

Preferred trifunctional vinyl aromatic compounds of formula (1) are represented below as general formula (1C) wherein, with reference to formula (1), Ar is a benzene ring, y is 0, $R^{31}$ is methyl, $R^{32}$ and $R^{33}$ are hydrogen, x is 1, and n is 3. The bonding structure to the benzene rings is shown generally and may be independently on each ring ortho, meta or para.

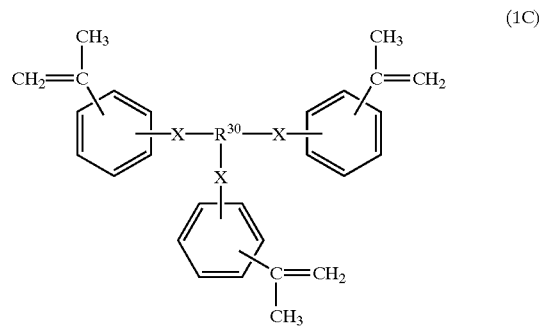

(1C)

Representative examples of the trifunctional vinyl aromatic compounds of formula (1C) include:

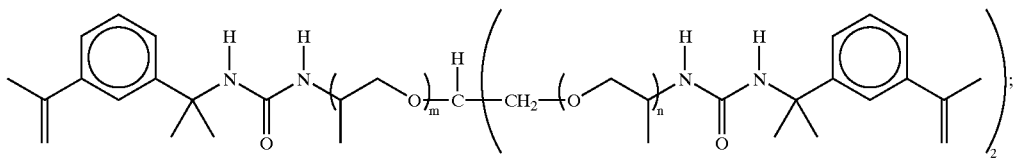

wherein (n+m) typically ranges from about 5 to 85;

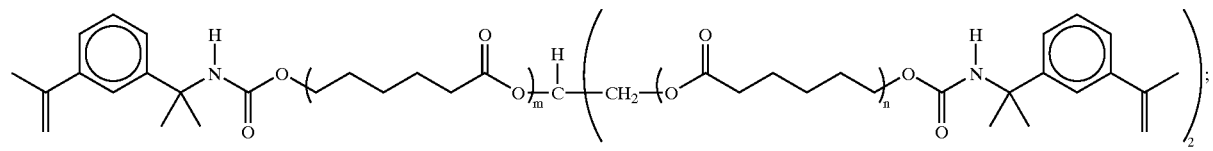

wherein (n+m) typically ranges from about 2 to 18.

Useful vinyl aromatic compounds of general formula (1) may be prepared, for example, by reacting 3-isopropenyl-α,α-dimethylbenzyl isocyanate (commerically available under the trade designation "TMI" from Cytec Industries, West Peterson, N.J.) with a mono- or multi-functional reactive hydrogen compound, preferably a mono- or multi-functional amine, alcohol or combination thereof. Particularly preferred mono- and multi-functional amines include the amine terminated polyethers commercially available under the trade designation "JEFFAMINE" (from Huntsman Chemical Co., Houston, Tex.) for example "JEFFAMINE ED600" (a diamine terminated polyether having a reported molecular weight of 600) "JEFFAMINE D400" (a diamine terminated polyether having a reported molecular weight of 400), "JEFFAMINE D2000" (a diamine terminated polyether having a reported molecular weight of 2000), "JEFFAMINE T3000" (a triamine terminated polyether having a reported molecular weight of 3000), and "JEFFAMINE M2005" (a monoamine terminated polyether having a reported molecular weight of 2000). Suitable alcohol-containing compounds include, for example, polypropylene glycol, polycaprolactone triol, diethylene glycol.

When the vinyl aromatic compound is synthesized as the reaction product of an alcohol with an isocyanate, it may be desirable to use a catalyst to speed the reaction between the isocyanate and the alcohol. Suitable catalysts are well known in the art and include, for example, dibutyltin dilaurate (DBTDL) (commercially available from Aldrich Chemical Co., Milwaukee, Wis.). Additional details pertaining to isocyanate catalysis may be found in Polyurethanes: Chemistry and Technology, Saunders and Frisch, Interscience Publishers (New York, 1963 (Part I) and 1964 (Part II)).

Representative examples of vinyl aromatic compounds of formula (2) include:

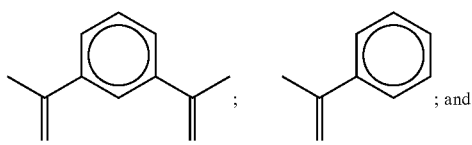
; and

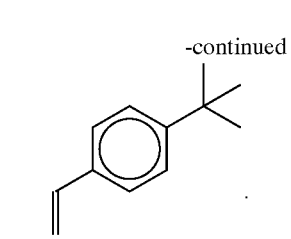

It may be desirable in some instances to add a free radical stabilizer to the vinyl aromatic compound of formula (1) or (2), particularly to vinyl aromatic compounds wherein $R^{31}$ is hydrogen. A free radical stabilizer functions to prevent premature free radical polymerization of the vinyl aromatic compound. One such free radical stabilizer is 2,6-di-tert-butyl-4-methylphenol (commercially available from Aldrich Chemical Co., Milwaukee, Wis.). When a free radical stabilizer is used, it is typically added in an amount ranging from about 10 to 5000 ppm.

Bonding compositions of the present invention comprise a vinyl aromatic compound of general formula (1) or (2) or a mixture thereof in an effective amount in order to provide the desired balance of worklife, rate of strength increase and cured bonding composition physical properties. The vinyl aromatic compound is used in an effective amount that does not materially, adversely affect the ultimate properties of the polymerized composition (for example, adhesion), depending on the intended use. Generally, for the vinyl aromatic compounds of formula (1), this is an amount of about 1%-wt. or greater, preferably about 5%-wt. or greater, more preferably about 5–25%-wt., based on the total weight of the bonding composition. For the vinyl aromatic compounds of formula (2) wherein $R^{31}$ is not hydrogen (e.g., a methyl group), this is an amount of about not more than about 1%-wt., more preferably not more than about 0.5%-wt. For the vinyl aromatic compounds of formula (2) wherein $R^{31}$ is hydrogen, this is an amount of about 1%-wt. or greater, preferably about 3%-wt. or greater, and most preferably about 5 to 15%-wt. or greater. Preferred bonding compositions retain at least 90% or greater, more preferably 95% or greater, and most preferably 99% or greater overlap shear strength at 10 minutes of open time (see, Overlap Shear Strength Test Method).

Polymerizable Monomers

Bonding compositions of the present invention include at least one polymerizable monomer. Broadly, the polymerizable monomer in a bonding composition of the present invention includes at least one ethylenically unsaturated monomer capable of free radical polymerization. Numerous compounds containing ethylenic unsaturation can be used in the bonding composition. Preferably, the composition includes at least one (meth)acrylic monomer, most preferably at least one methacrylic monomer. Particularly preferred are (meth)acrylic acid derivatives, such as those including esters and/or acid amides. Suitable are, for example, the (meth)acrylic esters of monohydric alcohols, particularly alkanols having from 1 to 12 carbon atoms, such as methyl (meth)acrylate, ethyl (meth)acrylate, butyl (meth)acrylate, n-hexyl (meth)acrylate, cyclohexyl (meth)acrylate, isooctyl (meth)acrylate, isobornyl (meth)acrylate, isodecyl (meth)acrylate, ethylhexyl (meth)acrylate; the (meth)acrylic esters of monohydric alcohols further including heteroatoms, such as tetrahydrofurfuryl (meth)acrylate and 2-ethoxyethyl (meth)acrylate; the (meth)acrylic acid esters of polyhydric alcohols, such as ethylene glycol, diethylene glycol, polyethylene glycol, trimethylol propane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes. (Meth)acrylic acid esters of polyhydric alcohols are hereinafter referred to as oligomeric (meth)acrylates.

Basically suitable are also polymerizable monomers, such as vinyl acetate; vinyl halides, such as vinyl chloride, vinyl fluoride, and vinyl bromide. These compounds, however, are generally used only in subordinate amounts in the polymerizable compositions.

Further suitable polymerizable monomers are acid amides, such as acrylamide; N-methyl(meth)acrylamide; N,N-dimethyl(meth)acrylamide; N-ethyl(meth)acrylamide; N,N-diethyl(meth)acrylamide; N-isopropyl(meth)acrylamide; N-butyl(meth)acrylamide; N-t-butyl(meth)acrylamide; N,N-dibutyl(meth)acrylamide; N-phenyl(meth)acrylamide; N-((meth)acryloyl)morpholine; N-((meth)acryloyl)piperidine; N-(1,1-dimethyl-3-oxobutyl)(meth)acrylamide; N-1,1,3,3-tetramethylbutyl(meth)acrylamide; methylene-bis-(meth)acrylamide; tetramethylene-bis-(meth)acrylamide; trimethylhexamethylene-bis-(meth)acrylamide; tri(meth)acryloyldiethylenetriamine; and similar compounds. Preferred acid amides include N,N-dimethyl(meth)acrylamide; N,N-diethyl(meth)acrylamide; N-butyl(meth)acrylamide; N,N-dibutyl(meth)acrylamide; N-((meth)acryloyl)morpholine; and N-((meth)acryloyl)piperidine.

In general, the emphasis is on monomers with one or two olefinic double bonds in the molecule, preferably one olefinic double bond. The additional use of higher unsaturated components is not excluded, but it must be kept in mind that their presence may adversely affect worklife and/or physical performance.

A preferred blend of monomers comprises 10–90%-wt. M1, 25–70%-wt. M2, and 0–65%-wt. M3 based on the total weight of the monomer blend, wherein:

M1 is tetrahydrofurfuryl methacrylate;

M2 is one or more monomers selected from the group consisting of 2-ethoxyethyl methacrylate, isooctyl acrylate, 2-ethylhexyl (meth)acrylate, and isobornyl acrylate; and M3 is one or more monomers selected from the group consisting of isobornyl methacrylate, and isodecyl methacrylate.

When vinyl aromatic compounds according to general formula (2) are employed in bonding compositions of the present invention, the polymerizable monomer blend preferably further comprises an oligomeric (meth)acrylate monomer prepared from a polyhydric alcohol selected from the group consisting of polyethylene glycol, polypropylene glycol, ethoxylated diphenylolpropane, propoxylated diphenylolpropane and hydroxy-terminated polyurethanes.

Additives

Bonding compositions of the present invention may further comprise optional additives. One particularly useful additive is a thickener, such as medium (i.e., about 40,000) molecular weight polybutyl methacrylate that may generally be incorporated in an amount of up to about 50%-wt., based on the total weight of the polymerizable monomer. Thickeners may be employed to increase the viscosity of the resulting bonding composition to a more easily applied viscous syrup-like consistency.

Another particularly useful additive is an elastomeric material. These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50%-wt., based on the total weight of the bonding composition.

Core-shell polymers can also be added to modify spreading and flow properties of the bonding composition. These enhanced properties may be manifested by a reduced tendency for the bonding composition to leave an undesirable "string" upon dispensing from a syringe-type applicator, or sag or slump after having been applied to a vertical surface. Accordingly, use of more than about 20%-wt., based on total weight of the bonding composition, of a core-shell polymer additive may be desirable for achieving improved sag-slump resistance. Core-shell polymers can also improve the fracture toughness of bonding compositions made therewith, which can be beneficial when, for example, bonding stiff, high yield strength materials (e.g., metal substrates that do not mechanically absorb energy as easily as other materials, such as flexible polymeric substrates).

Reactive diluents may also be added to bonding compositions of the present invention. Suitable reactive diluents include 1,4-dioxo-2-butene functional compounds as reported in U.S. Ser. No. 09/272,152 U.S. Pat. No. 6,252,023 Jun. 26, 2001 (Moren) and aziridine functional compounds as reported in U.S. Pat. No. 5,935,711 (Pocius et al.), the disclosures of which are incorporated herein by reference.

Small amounts of inhibitors, such as hydroquinone monomethyl ether may be used in the polymerizable compositions, for example, to prevent or reduce degradation of the polymerizable monomers during storage. Inhibitors may be added in an amount that does not materially affect the rate of polymerization or the ultimate properties of polymers made therewith. Accordingly, inhibitors are generally useful in amounts of about 100–10,000 ppm based on the total weight of the polymerizable monomers in the polymerizable composition.

Other possible additives include non-reactive colorants, fillers (e.g., carbon black, hollow glass/ceramic beads, silica, titanium dioxide, solid glass/ceramic spheres, electrically and/or thermally conductive particulate, antistatic compounds, and chalk), and the like. The various optional additives are employed in any amount, but generally amounts that do not significantly adversely affect the polymerization process or the desired properties of polymers made therewith.

Bonding compositions of the invention are especially useful for adhesively bonding low surface energy plastic or polymeric substrates that historically have been very difficult to bond without using complicated surface preparation techniques, for example, priming. By low surface energy substrates is meant materials that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, and fluorinated polymers such as polytetrafluoroethylene (TEFLON) which has a surface energy of less than 20 mJ/m$^2$. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The bonding compositions of the invention can be easily provided as two-part formulations. The acrylic monomers are blended as would normally be done when working with such materials. The bonding compositions of the present invention are preferably provided in two-part formulation with the parts being mixed prior to application of the bonding composition to a substrate. In this way, the polymerizable monomers may be separated from the organoborane initiator until cure (i.e., polymerization) of the bonding composition is desired. Accordingly, the first part or "Part A" of the two-part bonding composition comprises an organoborane initiator (preferably a complexed organoborane initiator) and may further comprise optionally additives, for example, a reactive diluent or plasticizer. The second part or "Part B" of the two-part bonding composition comprises at least one polymerizable monomer, and further comprises a decomplexer in the case where the organoborane initiator in Part A is complexed (e.g., an organoborane amine complex). Part B part may further comprise optional additives, for example, microspheres or a core-shell polymer. In bonding compositions of the present invention, a vinyl aromatic compound is included in Part A, Part B or both Part A and Part B.

For a two-part bonding composition such as those of the invention to be most easily used in commercial and industrial environments, the ratio at which the two parts are combined should be a convenient whole number. This facilitates application of the adhesive with conventional, commercially available dispensers. Such dispensers are shown in U.S. Pat. Nos. 4,538,920 and 5,082,147 and are available from ConProTec, Inc. (Salem N.H.) under the tradename "MIXPAC" and are sometimes described as dual syringe-type applicators.

Typically, these dispensers use a pair of tubular receptacles arranged side-by-side with each tube being intended to receive one of the two parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended bonding composition is extruded from the mixing chamber onto a substrate. Once the tubes have been emptied, they can be replaced with fresh tubes and the application process continued.

The ratio at which the two parts of the bonding composition are combined is controlled by the diameter of the tubes. (Each plunger is sized to be received within a tube of fixed diameter, and the plungers are advanced into the tubes at the same speed.) A single dispenser is often intended for use with a variety of different two-part bonding compositions and the plungers are sized to deliver the two parts of the bonding composition at a convenient mix ratio. Some common mix ratios are 1:1, 1:2, 1:4 and 1:10.

If the two parts of the bonding composition are combined in an odd mix ratio (e.g. 3.5:100), then the ultimate user would probably manually weigh the two parts of the adhesive. Thus, for best commercial and industrial utility and for ease of use with currently available dispensing equipment, the two parts of the bonding composition should be capable of being combined in a common, whole number mix ratio such as 1:10 or less, more preferably 1:4, 1:3, 1:2 or 1:1.

Bonding compositions of the invention are suited for use with conventional, commercially available dispensing equipment for two-part adhesives. The solubility of the organoborane in the vinyl aromatic compound can be advantageously used to modify the mix ratio of the two parts of the adhesive composition to the most commercially important whole number values (e.g., 1:10, 1:4, 1:3, 1:2 or 1:1).

Once the two parts have been combined, the bonding composition should preferably be used within a period of time less than or equal to the worklife of the bonding composition. The bonding composition is applied to one or both substrates and then the substrates are joined together with pressure to force excess composition out of the bond line. This also has the advantage of displacing bonding composition that has been exposed to air and that may have advanced too far in cure. In general, the bonds should be made shortly after the composition has been applied to the substrate, preferably within a period of time less than or equal to the worklife of the bonding composition. The typical bond line thickness is about 0.1 to 0.3 mm but may exceed 1.0 mm when gap filling is needed. The bonding process can easily be carried out at room temperature and to improve the degree of polymerization it is desirable to keep the temperature below about 40° C., preferably below 30° C. and most preferably below 25° C. Full strength will be reached in about 24 hours under ambient conditions. Post-curing at an elevated temperature may also be used if desired.

The invention will be more fully appreciated with reference to the following nonlimiting examples in which dimensions in English units are nominal and conversion to metric units is approximate.

Various tradenames and abbreviations used in the examples are defined according to the following schedule:

EXAMPLES

| Abbreviation | Description |
| --- | --- |
| TMI | 3-isopropenyl-α,α-dimethylbenzyl isocyanate, commercially available as TMI from Cytec Industries, West Peterson, NJ |
| ED600 | Difunctional amine-terminated polyether, commercially available as Jeffamine ™ ED600 from Huntsman Chemical Co., Houston, TX, nominal reported molecular weight (MW) 600 |
| D400 | Difunctional amine-terminated polyether, commercially available as Jeffamine ™ D400 from Huntsman Chemical Co., Houston, TX, nominal reported MW 400 |

-continued

| Abbreviation | Description |
|---|---|
| D2000 | Difunctional amine-terminated polyether, commercially available as Jeffamine ™ D2000 from Huntsman Chemical Co., Houston, TX, nominal reported MW 2000 |
| T3000 | Trifunctional amine-terminated polyether, commercially available as Jeffamine ™ T3000 from Huntsman Chemical Co., Houston, TX, nominal reported MW 3000 |
| M2005 | Monofunctional amine-terminated polyether, commercially available as Jeffamine ™ M2005 from Huntsman Chemical Co., Houston, TX, nominal reported MW 2000 |
| MeOH | Methanol, commercially available from Aldrich Chemical Co., Milwaukee, WI |
| DEG | Diethylene glycol, commercially available from Aldrich Chemical Co., Milwaukee, WI |
| PCL | Polycaprolactone triol, nominal reported MW 300, commercially available from Aldrich Chemical Co., Milwaukee, WI |
| PPG | Polypropylene glycol diol, nominal reported MW 1000, commercially available from Aldrich Chemical Co., Milwaukee, WI |
| HEMA | 2-hydroxyethyl methacrylate, commercially available from Aldrich Chemical Co., Milwaukee, WI |
| THFMA | Tetrahydrofurfuryl methacrylate, commercially available from Sartomer Co., Exton, PA |
| EHMA | 2-ethylhexyl methacrylate, commercially available from Aldrich Chemical Co., Milwaukee, WI |
| SR399 | Pentafunctional oligomeric acrylate, commercially available as SR 399 from Sartomer Co., Exton, PA |
| SR252 | Difunctional oligomeric methacrylate, commercially available as SR 252 from Sartomer Co., Exton, PA |
| SR344 | Difunctional oligomeric acrylate, commercially available as SR 344 from Sartomer Co., Exton, PA |
| SR9035 | Trifunctional oligomeric acrylate, commercially available as SR 9035 from Sartomer Co., Exton, PA |
| CN972 | Difunctional oligomeric acrylate, commercially available as CN 972 from Sartomer Co., Exton, PA |
| GluAcd | Glutaric acid, commercially available from Aldrich Chemical Co., Milwaukee, WI |
| NKEster | 2-methacryloyloxyethyl succinate, commercially available as NK Ester SA from Shin Nakamura, Japan |
| SucAnh | Succinic anhydride, commercially available from Aldrich Chemical Co., Milwaukee, WI |
| HPAnh | Hexahydrophthalic anhydride, commercially available from Aldrich Chemical Co., Milwaukee, WI |
| G40 | Polyester plasticizer, commercially available as Paraplex™ G40 from C. P. Hall, Chicago, IL |
| B360 | Core-shell rubber modifier, commercially available as Blendex ™ 360 from General Electric Specialty Chemicals, Parkersburg, WV |
| TEB | Triethylborane, commercially available from Aldrich Chemical Co., Milwaukee, WI |
| TEB*HMDA | Complex between 2 moles of triethylborane and 1 mole of hexamethylenediamine |
| TEB*D400 | Complex between 2 moles of triethylborane and 1 mole of Jeffamine ™ D400 |
| DBTDL | Dibutyltin dilaurate, commercially available from Aldrich Chemical Co., Milwaukee, WI |
| BHT | 2,6-di-tert-butyl-4-methylphenol, commercially available from Aldrich Chemical Co., Milwaukee, WI |
| CX100 | Trimethylolpropane tris(3-(2-methylaziridino))propionate, commercially available as Crosslinker CX-100 from Zeneca Resins, Wilmington, MA |
| W1600 | Ceramic microspheres, 100–350 microns diameter, commercially available as Z-Light ™ W1600 from 3M Co., St. Paul, MN |
| 1,3-DIB | 1,3-diisopropenylbenzene, commercially available from Aldrich Chemical Co., Milwaukee, WI |
| α-MeSty | α-methylstyrene, commercially available from Aldrich Chemical Co., Milwaukee, WI |
| 4-tBSty | 4-tert-butylstyrene, commercially available from Aldrich Chemical Co., Milwaukee, WI |

Overlap Shear Strength Test Method

Examples that were subsequently evaluated to measure the overlap shear strength of adhesive bonds made therewith were tested as described below.

More specifically, the test specimens used were similar to that described in ASTM D-1002 except that they were generated using panels of nominal dimensions 1 inch×4 inches×0.125 inch thick (2.5 cm×10.2 cm×0.3 cm thick).

The bonding composition was applied directly onto one untreated panel and a second untreated test panel was immediately placed against the bonding composition so that the overlapped area was 0.5 inch×1 inch (1.3 cm×2.5 cm). The bond was fixtured with binder clips and allowed to cure at room temperature (22° C.) for at least 48 hours, unless otherwise stated, at which time the clips were removed. The small amount of bonding composition that squeezed out of the bondline was allowed to remain.

Overlap shear testing was done on two types of panels: high density polyethylene (HDPE), as available from Cadillac Plastics Co, Minneapolis, Minn., and polypropylene (PP), as available from Cadillac Plastics Co, Minneapolis, Minn. Three bonds were made with each type of panel and with each bonding composition.

After curing, the bonds were tested to failure or to substrate yield using a tensile testing machine. The crosshead speed was 0.5 inches/minute (1.27 cm/minute) and the tests were carried out at room temperature. Maximum overlap shear values were recorded in pounds and converted into pounds per square inch (psi) and megapascals (MPa).

Worklife Test Method

The method outlined in the Overlap Shear Strength Test Method above was followed except that the second untreated test panel was not immediately placed against the bonding composition but rather the first panel bearing the bonding composition was allowed to stand in air for the time specified in the individual Examples. At the end of the elapsed time (i.e., open time), the second untreated panel was placed against the bonding composition to provide the overlapped area, clips were attached, and the bond cured for at least 48 hours at room temperature unless otherwise stated. The test panels were HDPE.

Rate of Strength Increase Test Method

The method outlined in the Overlap Shear Strength Test Method above was followed except that the bonds were cured for less than 48 hours. The bonds were cured for the times specified in the Examples. At the end of the elapsed time (i.e., cure time), the clips were removed and the bonds were tested as above. The test panels were HDPE.

T-Peel Test Method

The bonding composition was applied directly onto an untreated 0.03 inch (0.8 mm) thick HDPE film, commercially available from Cadillac Plastics Co, Minneapolis, Minn. A second untreated HDPE film was pressed against the bonding composition and held in contact using a 2.7 pound (1.2 kg.) weighted glass plate. Sufficient bonding composition was applied to the first film to provide an ultimate bond area of 1 inch (2.5 cm)×1.5 inch (3.8 cm). The bond was allowed to cure at room temperature (22° C.) for at least 24 hours, then trimmed to 1 inch (2.5 cm) width. One bond was made with each bonding composition.

After curing, the bonds were tested in a T-Peel mode using a tensile testing machine. The crosshead speed was 4 inches/minute (10.2 cm/minute) and the tests were carried out at room temperature. One free end of the bond was clamped in the upper jaw of the tensile testing machine and the remaining free end was clamped in the lower jaw. The bonds were tested until at least one lineal inch (2.5 cm) of bonding composition was exposed or until film failure occurred. The average force per inch width was recorded in pounds per inch width (piw) and converted to Newtons/centimeter (N/cm).

Synthesis of α-Methylstyrene Functional Oligomer

Four α-methylstyrene functional oligomers (Oligomer A, B, C, and D) having urea linkages were prepared as follows:

3-isopropenyl-α,α-dimethylbenzyl isocyanate (TMI) and amine-terminated polyether (Jeffamine™ series) were combined with stirring at room temperature in a glass vessel and allowed to stand at room temperature overnight. Infrared spectroscopy (IR) indicated complete reaction by disappearance of the 2265 $cm^{-1}$ isocyanate band. Components and their amounts are given in Table 1.

TABLE 1

| Oligomer | Polyether | TMI grams (moles) | Polyether grams (amine equivalents) |
|---|---|---|---|
| A | ED600 | 120.6 (0.6) | 180.0 (0.6) |
| B | D2000 | 120.6 (0.6) | 600.0 (0.6) |
| C | T3000 | 20.1 (0.1) | 104.2 (0.1) |
| D | M2005 | 1.41 (0.007) | 14.00 (0.007) |

Five α-methylstyrene functional oligomers (Oligomers E, F, G, H, and I) having urethane linkages were also prepared.

Oligomers E, F, G, and H were prepared by stirring together TMI, an alcohol, and DBTDL at room temperature in a glass vessel, heating the mixture to 70° C. and holding it at 70° C. for 18 hours.

Oligomer I was prepared by stirring together TMI, an alcohol, DBTDL, and 0.05 grams BHT at room temperature in a glass vessel, heating the mixture to 70° C. and holding it at 70° C. for 3 hours.

Infrared spectroscopy (IR) indicated complete reaction by disappearance of the 2265 $cm^{-1}$ isocyanate band. Components and their amounts are given in Table 2.

TABLE 2

| Oligomer | Alcohol | TMI grams (moles) | Alcohol grams (alcohol equivalents) | DBTDL (grams) |
|---|---|---|---|---|
| E | MeOH | 12.06 (0.06) | 1.92 (0.06) | 0.02 |
| F | DEG | 12.06 (0.06) | 3.18 (0.06) | 0.02 |
| G | PCL | 10.05 (0.05) | 5.00 (0.05) | 0.02 |
| H | PPG | 4.02 (0.02) | 10.00 (0.02) | 0.02 |
| I | HEMA | 30.15 (0.15) | 19.50 (0.15) | 0.04 |

Example 1

Initiator Component (Part A)

8.01 grams of TEB*HMDA was dissolved with stirring in 14.89 grams of CX-100 and 27.10 grams Oligomer A. The solution was allowed to stand so that air bubbles would rise and escape.

Polymerizable Component (Part B)

A slurry containing 172.50 grams B360, 405.00 grams THFMA, and 135.00 grams EHMA was heated to 70° C. and held at 70° C. for 3 hours. The resultant opaque dispersion was cooled to room temperature then sheared using a laboratory dispersator, fitted with a saw-toothed blade (available from Premier Mill Corporation, Reading, Pa.). Then 37.50 grams W1600 was added to the warm dispersion and mixed well to provide Monomer Blend A.

44.70 grams of Monomer Blend A was combined with 2.79 grams Oligomer A, 2.13 grams NKEster, and 0.38 grams SucAnh with stirring at room temperature. Air bubbles were removed from the mixture by briefly stirring under vacuum.

Bonding Comnposition (Example 1)

Part A and Part B were packed in a 1:10 volume ratio dual syringe applicator, commercially available from ConProTec, Salem, N.H. under the trade designation Mixpac System 50, Kit No. MP-0 50-10-09. Part B was packed in the larger cylinder.

Part A was combined with Part B by simultaneous extrusion through a 4 inch (10 cm) long, 17 stage static mix nozzle, commercially available from ConProTec, Salem, N.H. as Part No. MX 4 -0-17-5. The bonding composition was tested for Overlap Shear Strength, Worklife, Rate of Strength Increase, and T-Peel Strength according to the test methods outlined herein above. Test results are given in Table 3.

TABLE 3

| Test Method | Substrate | Test Conditions | Test Results |
|---|---|---|---|
| Overlap Shear Strength, psi (MPa) | PP | Per test method | 1114 (7.68) |
| | HDPE | Per test method | 883 (6.09) |
| Worklife, psi (MPa) | HDPE | Bond after 7.5 minutes | 794 (5.47) |
| | HDPE | Bond after 8.75 minutes | 796 (5.49) |
| | HDPE | Bond after 10.0 minutes | 770 (5.31) |
| | HDPE | Bond after 12.5 minutes | 758 (5.23) |
| Rate of Strength Increase, psi (MPa) | HDPE | Cure 1.5 hrs | 16 (0.11) |
| | HDPE | Cure 2.00 hrs | 22 (0.15) |
| | HDPE | Cure 2.25 hrs | 20 (0.14) |
| | HDPE | Cure 2.50 hrs | 49 (0.34) |
| | HDPE | Cure 2.75 hrs | 55 (0.38) |
| T-Peel Strength, piw (N/cm) | HDPE film | Per test method | 40 (70) |

Examples 2–23

These Examples demonstrate the utility of α-methylstyrene functional oligomer in a variety of bonding compositions.

Initiator Component (Part A)

Four initiator components (I-A, I-B, I-C, and I-D) were prepared according to the procedure of Example 1 using the components and amounts of Table 4.

TABLE 4

| Initiator Component | Oligomer A, grams | TEB*HMDA, grams | CX100, grams | G40, grams |
|---|---|---|---|---|
| I-A | 4.57 | 0.15 | 0.28 | — |
| I-B | 14.56 | 1.90 | 3.54 | — |
| I-C | 13.55 | 4.01 | 7.44 | — |
| I-D | 13.75 | 2.38 | 4.42 | 4.45 |

Polymerizable Component (Part B)

Twenty-two polymerizable components were prepared according to the procedure of Example 1 except that HPAnh was used in place of SucAnh. Components and amounts are given in Table 5.

Bonding Compositions (Examples 2–23)

Twenty-two bonding compositions were prepared according to the procedure of Example 1 using Parts A and B as outlined in Table 5.

TABLE 5

| | | Bonding Composition | | | |
|---|---|---|---|---|---|
| | | | Part B | | |
| Ex. No. | Part A | Oligomer A, grams | Monomer Blend A, grams | NKEster, grams | HPAnh, grams |
| 2 | I-B | 1.86 | 46.65 | 0.27 | 0.22 |
| 3 | I-C | 0.04 | 47.45 | 2.13 | 0.38 |
| 4 | I-B | 1.86 | 47.23 | 0.64 | 0.64 |
| 5 | I-D | — | 49.03 | 0.97 | — |
| 6 | I-A | 0.93 | 48.72 | 0.30 | 0.05 |
| 7 | I-D | — | 48.06 | 1.94 | — |
| 8 | I-C | 0.04 | 48.71 | 1.06 | 0.19 |
| 9 | I-C | 0.04 | 48.43 | 1.07 | 1.07 |
| 10 | I-C | 2.79 | 45.33 | 1.60 | 0.28 |
| 11 | I-D | — | 48.88 | 0.95 | 0.17 |
| 12 | I-D | — | 48.79 | 0.85 | 0.85 |
| 13 | I-B | 1.86 | 46.69 | 1.45 | — |
| 14 | I-B | 1.86 | 47.39 | 0.64 | 0.11 |
| 15 | I-D | — | 49.39 | 0.43 | 0.43 |
| 16 | I-C | 0.04 | 47.52 | 2.44 | — |
| 17 | I-C | — | 46.73 | 3.27 | — |
| 18 | I-C | 1.86 | 44.87 | 3.27 | — |
| 19 | I-C | 5.54 | 41.19 | 3.27 | — |
| 20 | I-C | 8.29 | 38.44 | 3.27 | — |
| 21 | I-C | — | 45.10 | 4.90 | — |
| 22 | I-C | 2.79 | 43.13 | 4.08 | — |
| 23 | I-C | 5.54 | 39.56 | 4.90 | — |

The bonding compositions were tested for Overlap Shear Strength, Worklife, Rate of Strength Increase, and T-Peel Strength according to the test methods outlined herein above. In all cases, Worklife Test Method open time was 10 minutes and Rate of Strength Increase Test Method cure time was 2 hours. Test results are given in Table 6.

TABLE 6

| | Overlap Shear Strength psi (MPa) | | Worklife, psi (MPa) | Rate of Strength Increase, psi (MPa) | T-Peel Strength, piw (N/cm) |
|---|---|---|---|---|---|
| Ex. No. | HDPE | PP | | | |
| 2 | 834 (5.75) | 809 (5.58) | 919 (6.34) | 15 (0.10) | 13.2 (23.1) |
| 3 | 902 (6.22) | 1106 (7.63) | 825 (5.69) | 20 (0.14) | 11.3 (19.8) |
| 4 | 785 (5.41) | 1064 (7.34) | 911 (6.28) | 14 (0.10) | 9.1 (15.9) |
| 5 | 536 (3.40) | 36 (0.25) | 195 (1.34) | 24 (0.17) | 6.8 (11.9) |
| 6 | 782 (5.39) | 252 (1.74) | 623 (4.30) | 37 (0.26) | 29.5 (51.7) |
| 7 | 871 (6.01) | 334 (2.30) | 741 (5.11) | 41 (0.28) | 16.6 (29.1) |
| 8 | 819 (5.65) | 902 (6.22) | 756 (5.21) | 19 (0.13) | 9.0 (15.8) |
| 9 | 846 (5.83) | 1063 (7.33) | 908 (6.26) | 28 (0.19) | 7.4 (13.0) |
| 10 | 855 (5.90) | 796 (5.49) | 878 (6.05) | 14 (0.10) | 20.6 (36.1) |
| 11 | 818 (5.64) | 805 (5.55) | 761 (5.25) | 19 (0.13) | 9.0 (15.8) |
| 12 | 783 (5.40) | 1019 (7.03) | 906 (6.25) | 19 (0.13) | 7.4 (13.0) |
| 13 | 857 (5.91) | 228 (1.57) | 740 (5.10) | 29 (0.20) | 29.6 (51.8) |
| 14 | 774 (5.34) | 223 (1.54) | 659 (4.54) | 23 (0.16) | 18.6 (32.6) |
| 15 | 750 (5.17) | 955 (6.58) | 762 (5.25) | 19 (0.13) | 7.5 (13.1) |
| 16 | 890 (6.14) | 428 (2.95) | 778 (5.36) | 33 (0.23) | 17.2 (30.1) |
| 17 | 830 (5.72) | 660 (4.55) | 515 (3.55) | 64 (0.44) | 14.6 (25.6) |
| 18 | 828 (5.71) | 769 (5.30) | 669 (4.61) | 75 (0.52) | 20.6 (36.1) |
| 19 | 829 (5.72) | 917 (6.32) | 702 (4.84) | 31 (0.21) | 20.8 (36.4) |
| 20 | 833 (5.74) | 923 (6.36) | 619 (4.27) | 37 (0.26) | 22.2 (38.9) |
| 21 | 833 (5.74) | 992 (6.84) | 580 (4.00) | 62 (0.43) | 21.8 (38.2) |
| 22 | 835 (5.76) | 938 (6.47) | 575 (3.96) | 61 (0.42) | 18.8 (32.9) |
| 23 | 832 (5.74) | 905 (6.24) | 735 (5.07) | 47 (0.32) | 39.3 (68.8) |

Comparative Examples C1–C6

These Comparative Examples illustrate the performance of bonding compositions that contain no vinyl aromatic functional compound.

Initiator Component (Part A)

Three initiator components (I-E, I-F, and I-G) were prepared according to the procedure of Example 1 using the components and amounts of Table 7.

TABLE 7

| Initiator Component | TEB*HEMA, grams | CX100, grams | G40, grams |
|---|---|---|---|
| I-E | 0.15 | 0.28 | 4.57 |
| I-F | 1.90 | 3.54 | 14.56 |
| I-G | 0.80 | 1.49 | 2.71 |

Polymerizable Component (Part B)

Six polymerizable components were prepared according to the procedure of Example 1 except that HPAnh was used in place of SucAnh. Components and amounts are given in Table 8.

Bonding Compositions (Examples C1–C6)

Six bonding compositions were prepared according to the procedure of Example 1 using Parts A and B as outlined in Table 8.

TABLE 8

| | | Bonding Composition | | |
|---|---|---|---|---|
| | | | Part B | |
| Ex. No. | Part A | Monomer Blend A, grams | NKEster, grams | HPAnh, grams |
| C1 | I-F | 49.25 | 0.64 | 0.11 |
| C2 | I-G | 48.12 | 1.60 | 0.28 |
| C3 | I-E | 49.65 | 0.30 | 0.05 |
| C4 | I-F | 48.55 | 1.45 | — |
| C5 | I-F | 48.51 | 1.27 | 0.22 |
| C6 | I-F | 49.09 | 0.64 | 0.27 |

The bonding compositions were tested for Overlap Shear Strength, Worklife, Rate of Strength Increase, and T-Peel Strength according to the test methods outlined herein above. In all cases, Worklife Test Method open time was 10 minutes and Rate of Strength Increase Test Method cure time was 2 hours. Test results are given in Table 9.

TABLE 9

| Ex. No. | Overlap Shear Strength, psi (MPa) HDPE | Overlap Shear Strength, psi (MPa) PP | Worklife, psi (MPa) | Rate of Strength Increase, psi (MPa) | T-Peel Strength, piw (N/cm) |
|---|---|---|---|---|---|
| C1 | 831 (5.73) | 613 (4.22) | 462 (3.19) | 36 (0.25) | 3.5 (6.1) |
| C2 | 915 (6.31) | 1016 (7.01) | 297 (2.05) | 39 (0.27) | 7.0 (12.3) |
| C3 | 623 (4.30) | 331 (2.28) | 348 (2.40) | 107 (0.74) | 7.8 (13.7) |
| C4 | 787 (5.43) | 190 (1.31) | 367 (2.53) | 38 (0.26) | 9.1 (15.9) |
| C5 | 852 (5.87) | 778 (5.36) | 464 (3.20) | 48 (0.33) | 4.8 (8.4) |
| C6 | 861 (5.94) | 956 (6.59) | 456 (3.14) | 89 (0.61) | 3.0 (5.3) |

Example 24

This example demonstrates the utility of α-methylstyrene functional oligomer in combination with a dibasic carboxylic acid borane decomplexing agent.

Initiator Component (Part A)

2.00 grams of TEB*HMDA was dissolved with stirring in 8.00 grams Oligomer A. Air bubbles were removed from the mixture by briefly stirring under vacuum.

Polvmerizable Component (Part B)

49.79 grams of Monomer Blend A were combined with 0.21 grams GluAcd with stirring at room temperature. Air bubbles were removed from the mixture by briefly stirring under vacuum.

Bonding Composition (Example 24)

Part A and Part B were packaged as in Example 1. Part A was combined with Part B by simultaneous extrusion as in Example 1.

The bonding composition was tested for Overlap Shear Strength, Worklife, Rate of Strength Increase, and T-Peel Strength according to the test methods outlined hereinabove. Test results are given in Table 10.

TABLE 10

| Test Method | Substrate | Test Conditions | Test Results |
|---|---|---|---|
| Overlap Shear Strength, psi (MPa) | PP | Per test method | 870 (6.00) |
| Overlap Shear Strength, psi (MPa) | HDPE | Per test method | 916 (6.32) |
| Worklife, psi (MPa) | HDPE | Bond after 10 minutes | 859 (5.92) |
| Rate of Strength Increase, psi (MPa) | HDPE | Cure 7.0 hrs | 101 (0.70) |
| T-Peel Strength, piw (N/cm) | HDPE film | Per test method | 26.4 (46.2) |

Example 25 and Comparative Example C7

These Examples contrast bonding compositions with and without α-methylstyrene functional oligomer.

Initiator Component (Part A)

Two initiator components (I-a and I-b) were prepared according to the procedure of Example 1 using the components and amounts of Table 11.

TABLE 11

| Initiator Component | Oligomer A, grams | TEB*HMDA, grams | CX100, grams | G40, grams |
|---|---|---|---|---|
| I-a | 8.09 | 2.35 | 4.37 | — |
| I-b | — | 15.68 | 29.12 | 53.90 |

Polymerizable Component (Part B)

A polymerizable component was prepared according to the procedure of Example 1 from 474.50 grams Monomer Blend A, 24.50 grams NKEster, and 1.00 grams SucAnh. Air bubbles were removed from the mixture by briefly stirring under vacuum. This part B was used for both Example 25 and C7.

Bonding Compositions (Examples 25 and C7)

Bonding compositions were prepared according to the procedure of Example 1. Example 25 was prepared using Initiator Component I-a for Part A. Example C7 was prepared using Initiator Component I-b for Part A.

The bonding compositions were tested for Overlap Shear Strength, Worklife, Rate of Strength Increase, and T-Peel Strength according to the test methods outlined herein above. HDPE panels were used to determine Overlap Shear Strength. The test condition for Rate of Strength Increase Test Method cure time was 1 hour.

TABLE 12

| Ex. No. | Overlap Shear Strength, psi (MPa) | Worklife, psi (MPa) Bond after 5 minutes | Worklife, psi (MPa) Bond after 20 minutes | Rate of Strength Increase, psi (MPa) |
|---|---|---|---|---|
| 25 | 940 (6.48) | 955 (6.58) | 574 (3.96) | 7 (0.05) |
| C7 | 869 (5.99) | 462 (3.19) | 166 (1.14) | 16 (0.11) |

Example 26

This example illustrates a bonding composition of the invention with a worklife of about 50 minutes as determined by the Worklife Test Method.

Initiator Component (Part A)

0.80 grams of TEB*HMDA was dissolved with stirring in 4.20 grams Oligomer A. Air bubbles were removed from the mixture by briefly stirring under vacuum.

Polymerizable Component (Part B)

48.27 grams of Monomer Blend A was combined with 1.03 grams TMI, with stirring at room temperature. Air bubbles were removed from the mixture by briefly stirring under vacuum.

Bonding Composition (Example 26)

Part A and Part B were packaged as in Example 1. Part A was combined with Part B by simultaneous extrusion as in Example 1.

The bonding composition was tested for Overlap Shear Strength, Worklife, Rate of Strength Increase, and T-Peel Strength according to the test methods outlined herein above and at the test conditions specified below. Test results are given in Table 13.

TABLE 13

| Test Method | Substrate | Test Conditions | Test Results |
|---|---|---|---|
| Overlap Shear Strength, psi (MPa) | PP | Cure 6 days | 1122 (7.74) |
| | HDPE | Cure 6 days | 855 (5.90) |
| Worklife, psi (MPa) | HDPE | Bond after 10 minutes, cure 6 days | 930 (5.41) |
| | HDPE | Bond after 38 minutes, cure 6 days | 784 (5.49) |
| | HDPE | Bond after 48 minutes, cure 6 days | 842 (5.81) |
| | HDPE | Bond after 63 minutes, cure 6 days | 567 (3.91) |
| Rate of Strength Increase, psi (MPa) | HDPE | Cure 2 hrs | 6 (0.04) |
| | HDPE | Cure 4 hrs | 9 (0.06) |
| | HDPE | Cure 5.5 hrs | 9 (0.13) |
| | HDPE | Cure 7 hrs | 69 (0.48) |
| T-Peel Strength, piw (N/cm) | HDPE film | Cure 6 days | 11 (19.3) |

Comparative Example C8

This example illustrates the difference in bonding composition performance when a polyester plasticizer is used in place of an α-methylstyrene functional oligomer.

Initiator Component (Part A)

0.80 grams of TEB*HMDA was dissolved with stirring in 4.20 grams G40. Air bubbles were removed from the mixture by briefly stirring under vacuum.

Polymerizable Component (Part B)

48.97 grams of Monomer Blend A were combined with 1.03 grams TMI, with stirring at room temperature. Air bubbles were removed from the mixture by briefly stirring under vacuum.

Bonding Composition (Example C8)

Part A and Part B were packaged as in Example 1. Part A was combined with Part B by simultaneous extrusion as in Example 1.

The bonding composition was tested for Worklife and Rate of Strength Increase according to the test methods outlined herein above and at the test conditions specified below. Test results are given in Table 14.

TABLE 14

| Test Method | Substrate | Test Conditions | Test Results |
|---|---|---|---|
| Worklife, psi (MPa) | HDPE | Bond after 30 minutes | 709 (4.89) |
| | HDPE | Bond after 40 minutes | 794 (5.47) |
| | HDPE | Bond after 50 minutes | 614 (4.23) |
| | HDPE | Bond after 60 minutes | 553 (3.81) |
| Rate of Strength Increase, psi (MPa) | HDPE | Cure 4.25 hrs | 23 (0.16) |
| | HDPE | Cure 6 hrs | 27 (0.19) |
| | HDPE | Cure 7 hrs | 36 (0.25) |

Example 27

This example demonstrates the utility of a higher molecular weight organoborane-amine complex in a bonding composition of the invention.

Initiator Component (Part A)

1.02 grams of TEB*D400 was dissolved with stirring in 3.98 grams Oligomer A. Air bubbles were removed from the mixture by briefly stirring under vacuum.

Polymerizable Component (Part B)

48.97 grams of Monomer Blend A were combined with 1.03 grams TMI, with stirring at room temperature. Air bubbles were removed from the mixture by briefly stirring under vacuum.

Bonding Composition (Example 27)

Part A and Part B were packaged as in Example 1. Part A was combined with Part B by simultaneous extrusion as in Example 1.

The bonding composition was tested for Overlap Shear Strength, Worklife, and Rate of Strength Increase according to the test methods outlined herein above and at the test conditions specified below. Test results are given in Table 15.

TABLE 15

| Test Method | Substrate | Test Conditions | Test Results |
|---|---|---|---|
| Overlap Shear Strength, psi (MPa) | HDPE | Per test method | 809 (5.58) |
| Worklife, psi (MPa) | HDPE | Bond after 30 minutes | 823 (5.67) |
| | HDPE | Bond after 45 minutes | 801 (5.52) |
| | HDPE | Bond after 60 minutes | 751 (5.18) |
| Rate of Strength Increase, psi (MPa) | HDPE | Cure 4 hrs | 16 (0.11) |
| | HDPE | Cure 6 hrs | 25 (0.17) |
| | HDPE | Cure 7.5 hrs | 44 (0.30) |

Examples 28–41

These examples illustrate the utility of different α-methylstyrene functional oligomers in bonding compositions of the invention. Additionally Example 35 illustrates that an α-methylstyrene functional oligomer can be used in the polymerizable component (Part B) instead of the initiator component (Part A).

Initiator Component (Part A)

Nine initiator components (I-H, I-I, I-J, I-K, I-L, I-M, I-N, I-O, and I-P) were prepared according to the procedure of Example 1 using the components and amounts of Table 16.

TABLE 16

| Initiator Component | Oligomer | Oligomer, grams | TEB*HMDA, grams | CX100, grams | G40, grams |
|---|---|---|---|---|---|
| I-H | B | 10.86 | 3.20 | 5.94 | — |
| I-I | C | 10.86 | 3.20 | 5.94 | — |
| I-J | D | 4.40 | 1.26 | 2.34 | — |
| I-K | E | 2.05 | 1.26 | 2.34 | 2.35 |
| I-L | E | 4.40 | 1.26 | 2.34 | — |
| I-M | F | 2.23 | 1.26 | 2.34 | 2.17 |
| I-N | G | 2.64 | 1.26 | 2.34 | 1.76 |
| I-O | H | 4.40 | 1.26 | 2.34 | — |
| I-P | — | — | 1.57 | 2.91 | 5.52 |

Polymerizable Component (Part B)

Nine polymerizable components used in Examples 28–41 were prepared according to the procedure of Example 1 except that for Examples 28–34, HPAnh was used in place of SucAnh. The polymerizable component of Example 35 also contained 0.09 grams SucAnh. Components and amounts are given in Tables 17 and 18.

Bonding Comnpositions (Examples 28–41)

Twenty-two bonding compositions were prepared according to the procedure of Example 1. Examples 28–35 were prepared using Parts A and B as outlined in Table 17 below. Examples 36–41 were prepared using Parts A and B in Table 18. Part B for Examples 36–41 was prepared as a masterbatch of 188.6 grams Monomer Blend A, 10.00 grams SR399, and 1.40 grams SucAnh.

TABLE 17

| | | Bonding Composition | | |
|---|---|---|---|---|
| | | Part B | | |
| Ex. No. | Part A | Oligomer and Amt., grams | Monomer Blend A, grams | NKEster, grams | HPAnh, grams |
| 28 | I-H | B, 2.79 | 44.70 | 2.13 | 0.38 |
| 29 | I-H | B, 10.49 | 37.00 | 2.13 | 0.38 |
| 30 | I-I | C, 1.14 | 46.35 | 2.13 | 0.38 |
| 31 | I-I | C, 2.79 | 44.70 | 2.13 | 0.38 |
| 32 | I-I | C, 4.44 | 43.05 | 2.13 | 0.38 |
| 33 | I-I | C, 6.09 | 41.40 | 2.13 | 0.38 |
| 34 | I-I | C, 7.74 | 37.75 | 2.13 | 0.38 |
| 35[(1)] | I-P | I, 2.50 | 45.09 | 2.32 | — |

[(1)]also contained 0.09 grams SucAnh.

TABLE 18

| | | Bonding Composition | | |
|---|---|---|---|---|
| | | Part B | | |
| Ex. No. | Part A | Monomer Blend A, grams | SR399, grams | SucAnh, grams |
| 36 | I-J | 188.6 | 10.00 | 1.40 |
| 37 | I-K | | | |
| 38 | I-L | | | |
| 39 | I-M | | | |
| 40 | I-N | | | |
| 41 | I-O | | | |

Part A and Part B were packaged as in Example 1. Part A was combined with Part B by simultaneous extrusion as in Example 1.

The bonding composition was tested for Overlap Shear Strength, Worklife, and Rate of Strength Increase according to the test methods outlined herein above. In all cases, Worklife Test Method open time was 10 minutes and Rate of Strength Increase Test Method cure time was 2 hours. Test results are given in Table 19.

TABLE 19

| Ex. No. | Overlap Shear Strength, psi (MPa) | | Worklife, psi (MPa) | Rate of Strength Increase, psi (MPa) | T-Peel Strength, piw (N/cm) |
|---|---|---|---|---|---|
| | HDPE | PP | | | |
| 28 | 749 (5.16) | 1003 (6.92) | 780 (5.38) | — | 15.8 (27.7) |
| 29 | 657 (4.53) | 765 (5.27) | 720 (4.96) | — | 30.0 (52.5) |
| 30 | 831 (4.53) | 1158 (7.98) | 826 (5.70) | 111 (0.77) | 18.5 (32.4) |
| 31 | 827 (5.70) | 1129 (7.78) | 813 (5.61) | 96 (0.66) | 33.1 (58.0) |
| 32 | 833 (5.74) | 1137 (7.84) | 820 (5.65) | 77 (0.53) | 29.3 (51.3) |
| 33 | 833 (5.74) | 1111 (7.66) | — | 107 (0.74) | 38.0 (66.5) |
| 34 | 833 (5.74) | 1080 (7.45) | — | 93 (0.64) | 34.8 (60.9) |
| 35 | 932 (6.43) | — | 916 (6.32) | 16 (0.11) | — |
| 36 | 839 (5.78) | — | 635 (4.38) | 198 (1.37) | — |
| 37 | 687 (4.74) | — | 799 (5.51) | 16 (0.11) | 3.1 (5.4) |
| 38 | 632 (4.36) | — | 869 (5.99) | 3 (0.02) | 4.6 (8.05) |
| 39 | 735 (5.07) | — | 763 (5.26) | 33 (0.23) | 2.9 (5.1) |
| 40 | 811 (5.59) | — | 698 (4.81) | 44 (0.30) | 3.5 (6.1) |
| 41 | 856 (5.90) | — | 730 (5.03) | 103 (0.71) | 6.1 (10.7) |

Examples 42–44

These Examples demonstrate the utility of bonding compositions containing mixtures of α-methylstyrene functional oligomers.

Initiator Component (Part A)

The initiator component I-H of Examples 28–41 was used as the initiator component for Examples 42–44.

Polymerizable Component (Part B)

Three polymerizable components were prepared according to the procedure of Example 1 except that HPAnh was used in place of SucAnh. Components and amounts are given in Table 20.

Bonding Compositions (Examples 42–44)

Three bonding compositions were prepared according to the procedure of Example 1 using Parts A and B as outlined in Table 20 below.

TABLE 20

| | | Bonding Composition | | | | |
|---|---|---|---|---|---|---|
| | | Part B | | | | |
| Ex. No. | Part A | Oligomer and Amt., grams | Oligomer and Amt., grams | Monomer Blend A, grams | NKEster, grams | HPAnh, grams |
| 42 | I-H | B, 0.93 | E, 1.85 | 44.70 | 2.13 | 0.38 |
| 43 | I-H | C, 6.09 | — | 41.40 | 2.13 | 0.38 |
| 44 | I-H | C, 7.74 | — | 39.75 | 2.13 | 0.38 |

Part A and Part B were packaged as in Example 1. Part A was combined with Part B by simultaneous extrusion as in Example 1.

The bonding composition was tested for Overlap Shear Strength, Worklife, and Rate of Strength Increase according to the test methods outlined herein above. In all cases, Worklife Test Method open time was 10 minutes and Rate of Strength Increase Test Method cure time was 2 hours. Test results are given in Table 21.

TABLE 21

| Ex. No. | Overlap Shear Strength, psi (MPa) | | Worklife, psi (MPa) | Rate of Strength Increase, psi (MPa) | T-Peel Strength, (N/cm) |
|---|---|---|---|---|---|
| | HDPE | PP | | | |
| 42 | 821 (5.66) | 1017 (7.01) | 906 (6.25) | — | 20 (3.5) |
| 43 | 828 (5.71) | 1097 (7.56) | 446 (3.08) | 56 (0.39) | 32.1 (56.2) |
| 44 | 820 (5.56) | 993 (6.85) | 341 (2.35) | 60 (0.41) | 31.5 (55.2) |

Examples 45–49

These Examples demonstrate the utility of bonding compositions containing non-oligomeric vinyl aromatic compounds in place of α-methylstyrene functional oligomers.

Initiator Component (Part A)

The initiator component I-b of Comparative Example C7 was used as the initiator component for Examples 45–49.

Polymerizable Component (Part B)

Five polymerizable components were prepared according to the procedure of Example 1 and the components and amounts as listed in Table 22. The non-oligomeric vinyl aromatic compound used in Examples 45–47 was 1,3-DIB and in Examples 48–49, α-MeSty.

Bonding Compositions (Examples 45–49)

Five bonding compositions were prepared according to the procedure of Example 1 using Parts A and B as outlined in Table 22 below.

Part A and Part B were packaged as in Example 1. Part A was combined with Part B by simultaneous extrusion as in Example 1.

TABLE 22

| | | Bonding Composition | | | |
|---|---|---|---|---|---|
| | | Part B | | | |
| Ex. No. | Part A | Non-oligomeric Vinyl Aromatic Compd. and Amt., grams | Monomer Blend A, grams | NKEster grams | HPAnh, grams |
| 45 | I-b | 1,3-DIB, 0.05 | 47.42 | 2.15 | 0.38 |
| 46 | I-b | 1,3-DIB, 0.10 | 47.37 | 2.15 | 0.38 |
| 47 | I-b | 1,3-DIB, 0.20 | 47.27 | 2.15 | 0.38 |
| 48 | I-b | α-MeSty, 0.05 | 43.14 | 2.15 | 0.38 |
| 49 | I-b | α-MeSty, 0.10 | 39.54 | 2.15 | 0.38 |

The bonding composition was tested for Overlap Shear Strength, Worklife, and Rate of Strength Increase according to the test methods outlined herein above. In all cases, Worklife Test Method open time was 10 minutes and Rate of Strength Increase Test Method cure time was 2 hours. Test results are given in Table 23.

TABLE 23

| Ex. No. | Overlap Shear Strength, psi (MPa) | | Worklife, psi (MPa) | Rate of Strength Increase, psi (MPa) | T-Peel Strength, piw (N/cm) |
|---|---|---|---|---|---|
| | HDPE | PP | | | |
| 45 | 876 (6.04) | 750 (5.17) | 803 (5.54) | 25 (0.17) | 4.6 (8.1) |
| 46 | 898 (6.19) | 910 (6.27) | 910 (6.27) | 13 (0.09) | 7.8 (13.7) |
| 47 | 847 (5.84) | 853 (5.88) | 903 (6.23) | 8 (0.06) | 6.2 (10.9) |
| 48 | 962 (6.63) | 894 (6.16) | 422 (2.91) | 5 (0.03) | 10.1 (17.7) |
| 49 | 959 (6.61) | 596 (4.11) | 481 (3.32) | 2 (0.01) | 9.4 (16.5) |

Examples 50–51

These Examples demonstrate the utility of bonding compositions containing a non-oligomeric vinyl aromatic compound (1,3-DIB), in place of α-methylstyrene funtional oligomers, and an oligomeric methacrylate (SR252).

Initiator Component (Part A)

The initiator component I-b of Comparative Example C7 was used as the initiator component for Examples 50–51.

Polymerizable Component (Part B)

Two polymerizable components were prepared according to the procedure of Example 1 and the components and amounts of Table 24.

Bonding Compositions (Examples 50–51)

Five bonding compositions were prepared according to the procedure of Example 1 using Parts A and B as outlined in Table 24 below.

Part A and Part B were packaged as in Example 1. Part A was combined with Part B by simultaneous extrusion as in Example 1.

TABLE 24

| | | Bonding Composition | | | | |
|---|---|---|---|---|---|---|
| | | Part B | | | | |
| Ex. No. | Part A | 1,3-DIB grams | SR252, grams | Monomer Blend A, grams | NKEster grams | HPAnh, grams |
| 50 | I-b | 0.10 | 2.69 | 44.70 | 2.13 | 0.38 |
| 51 | I-b | 0.10 | 5.50 | 41.89 | 2.13 | 0.38 |

The bonding composition was tested for Overlap Shear Strength, Worklife, and Rate of Strength Increase according to the test methods outlined herein above. In all cases, Rate of Strength Increase Test Method cure time was 2 hours. Test results are given in Table 25.

TABLE 25

| Ex. No. | Overlap Shear Strength, psi (MPa) | | Worklife, psi (MPa) | | Rate of Strength Increase, psi (MPa) | T-Peel Strength, piw (N/cm) |
|---|---|---|---|---|---|---|
| | HDPE | PP | Bond after 5 minutes | Bond after 10 minutes | | |
| 50 | 752 (5.18) | 1015 (7.00) | 971 (6.69) | 906 (6.25) | 11 (0.08) | 3.4 (6.0) |
| 51 | 801 (5.52) | 940 (6.48) | 905 (6.24) | 587 (4.05) | 16 (0.11) | 12.2 (21.4) |

Examples 52–54

These Examples demonstrate the utility of bonding compositions containing a non-oligomeric vinyl aromatic functional compound (4-tBSty), in place of α-methylstyrene functional oligomers, and an oligomeric acrylate (SR344, SR9035, or CN972).

Initiator Component (Part A)

The initiator component I-b of Comparative Example C7 was used as the initiator component for Examples 52–54.

Polymerizable Component (Part B)

A Monomer Blend B was prepared according to the procedure of Example 1 using 195.00 grams THFMA, 65.00 grams EHMA, 115.00 grams B360, 25.00 grams W1600, 25.00 grams 4-tBSty, 21.25 grams NKEster, and 3.75 grams HPAnh.

Three polymerizable components were prepared according to the procedure of Example 1 using the components and amounts given in Table 26.

Bonding Compositions (Examples 52–54)

Five bonding compositions were prepared according to the procedure of Example 1 using Parts A and B as outlined in Table 26 below.

Part A and Part B were packaged as in Example 1. Part A was combined with Part B by simultaneous extrusion as in Example 1.

TABLE 26

| | | Bonding Composition | |
| | | Part B | |
| Ex. No. | Part A | Oligomeric (Meth)acrylate and Amt., grams | Monomer Blend B, grams |
| --- | --- | --- | --- |
| 52 | I-b | SR344, 5.00 | 45.00 |
| 53 | I-b | SR9035, 5.00 | 45.00 |
| 54 | I-b | CN972, 5.00 | 45.00 |

The bonding composition was tested for Overlap Shear Strength, Worklife, and Rate of Strength Increase according to the test methods outlined herein above. In all cases, Rate of Strength Increase Test Method cure time was 2 hours. Test results are given in Table 27.

TABLE 27

| | Worklife, psi (MPa) | | Rate of Strength | |
| Ex. No. | Bond after 5 minutes | Bond after 10 minutes | Increase, psi (MPa) | T-Peel Strength, piw (N/cm) |
| --- | --- | --- | --- | --- |
| 52 | 937 (6.46) | 722 (4.98) | 6 (0.04) | 13.8 (24.2) |
| 53 | 776 (5.35) | 572 (3.94) | 11 (0.08) | 15.6 (27.3) |
| 54 | 856 (5.90) | 675 (4.65) | 9 (0.06) | 26.9 (47.1) |

Patents and patent applications disclosed herein are incorporated by reference as if individually incorporated. It is to be understood that the above description is intended to be illustrative and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A bonding composition comprising:
   (i) an organoborane;
   (ii) at least one polymerizable monomer; and
   (iii) a vinyl aromatic compound according to general formula (1);

$$R^{30}\left(X-Ar\overset{(R^{34})_y}{\underset{|}{\phantom{X}}}(CR^{31}=CR^{32}R^{33})_x\right)_n \quad (1)$$

wherein:
   n is an integer having a value of 1 or greater;
   x is an integer having a value of 1 or greater;
   y is an integer having a value of 0 or greater;
   Ar is a substituted aryl group;
   $R^{31}$, $R^{32}$ and $R^{33}$ are independently selected from the group consisting of hydrogen, alkyl, aryl and halogen;
   $R^{34}$ is an organic group wherein each $R^{34}$ is independently selected from the group consisting of alkyl, alkoxy, alkanoyl, alkanoyloxy, aryloxy, aroyl, aroyloxy, and halogen;
   X is a divalent organic group or a covalent bond;
   $R^{30}$ is an organic group;
   wherein a total molecular weight of each X plus $R^{30}$ in said vinyl aromatic compound is 100 or greater.

2. The bonding composition of claim 1, wherein Ar is selected from the group consisting of substituted benzene ring having the formula $C_6H_{5-x-y}$ and a substituted napthalene ring having the formula $C_{10}H_{7-x-y}$.

3. The bonding composition of claim 1, wherein n is 2 or greater.

4. The bonding composition of claim 1, wherein $R^{31}$ is hydrogen or a methyl group, $R^{32}$ and $R^{33}$ are hydrogen, and y is 0.

5. The bonding composition of claim 1, wherein X includes a urea or a urethane functional group.

6. The bonding composition of claim 5, wherein X is $$-R^{35}-NH-\overset{O}{\underset{\|}{C}}-O-; \quad \text{or} \quad -R^{36}-NH-\overset{O}{\underset{\|}{C}}-NH-;$$

wherein $R^{35}$ and $R^{36}$ are divalent organic linking groups having from 1–10 carbon atoms and wherein at least one of $R^{35}$ and $R^{36}$ is bonded to Ar in formula (1).

7. The bonding composition of claim 6, wherein
   n ranges from 1–3;
   Ar is a substituted benzene ring having the formula $C_6H_{5-x-y}$;
   $R^{31}$ is a methyl group;
   $R^{32}$ and $R^{33}$ are hydrogen;
   X is $$-R^{35}-NH-\overset{O}{\underset{\|}{C}}-O-;$$

where $R^{35}$ is a divalent organic linking group having from 1 to 10 carbon atoms;
   $R^{30}$ is a polyester polymer having a molecular weight ranging from about 300–1000;
   x is 1; and
   y is 0.

8. The bonding composition of claim 6, wherein
   n ranges from 1–3;
   Ar is a substituted benzene ring having the formula $C_6H_{5-x-y}$;
   $R^{31}$ is a methyl group;
   $R^{32}$ and $R^{33}$ are hydrogen;
   X is $$-R^{35}-NH-\overset{O}{\underset{\|}{C}}-O-; \quad \text{or} \quad -R^{36}-NH-\overset{O}{\underset{\|}{C}}-NH-;$$

where $R^{35}$ and $R^{36}$ are divalent organic linking groups having from 1 to 10 carbon atoms;
   $R^{30}$ is a polyether polymer having a molecular weight ranging from about 500–3000;
   x is 1; and
   y is 0.

9. The bonding composition of claim 1, wherein $R^{30}$ is an oligomer or a polymer.

10. The bonding composition of claim 9, wherein $R^{30}$ is a polymer selected from the group consisting of polyolefins, polyethers, and polyesters.

11. The bonding composition of claim 10, wherein the molecular weight of $R^{30}$ ranges from about 300 to 3000.

12. The bonding composition of claim 1, wherein the vinyl aromatic compound has the formula:

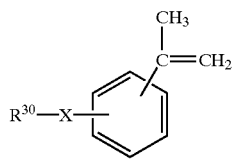

wherein X is a divalent organic group or a covalent bond; $R^{30}$ is an organic group;
wherein a total molecular weight of X plus $R^{30}$ is 100 or greater.

13. The bonding composition of claim 12, wherein the vinyl aromatic compound of formula (1) is a monofunctional vinyl aromatic compound selected from the group consisting of:

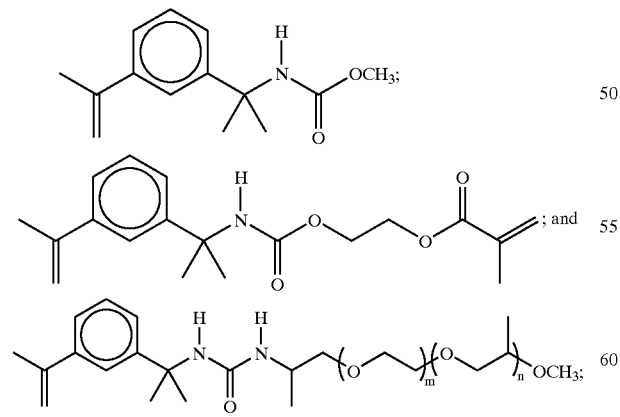

wherein m ranges from about 0 to 50; and
n ranges from about 0 to 48.

14. The bonding composition of claim 1, wherein the vinyl aromatic compound has the formula:

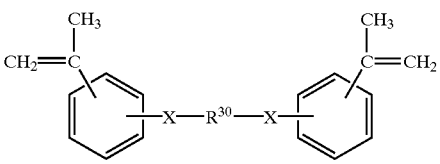

wherein X is a divalent organic group or a covalent bond;

$R^{30}$ is an organic group;

wherein a total molecular weight of each X plus $R^{30}$ is 100 or greater.

15. The bonding composition of claim 14, wherein the vinyl aromatic compound of formula (1) is a difunctional vinyl aromatic compound selected from the group consisting of:

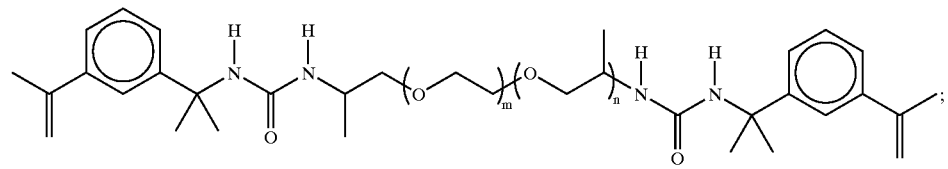

wherein m ranges from about 0 to 50; and
n ranges from about 0 to 50; and

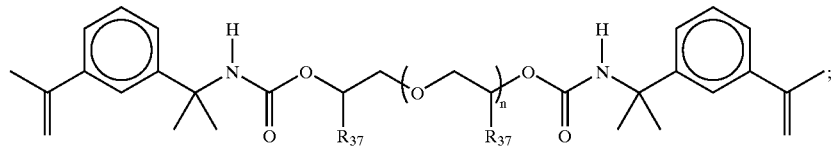

wherein n ranges from about 0 to 140; and
$R_{37}$ is methyl or hydrogen.

16. The bonding composition of claim 1, wherein the vinyl aromatic compound has the formula:

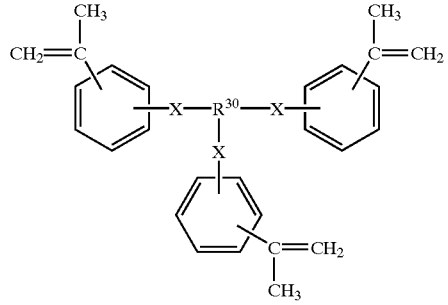

wherein X is a divalent organic group or a covalent bond;
$R^{30}$ is an organic group;
wherein a total molecular weight of each X plus $R^{30}$ is 100 or greater.

17. The bonding composition of claim 16, wherein the vinyl aromatic compound of formula (1) is a trifunctional vinyl aromatic compound selected from the group consisting of:

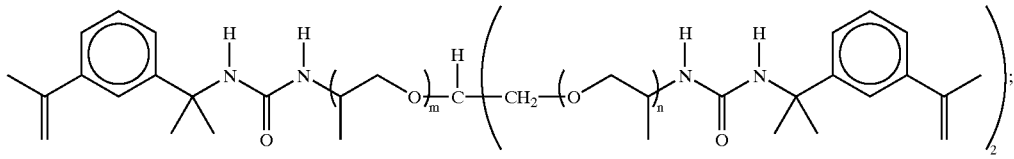

wherein (n+m) ranges from about 5 to 85; and

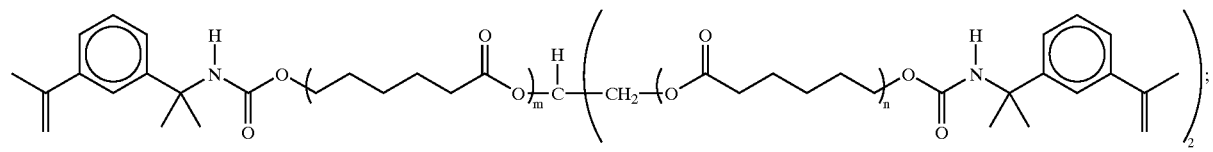

wherein (n+m) ranges from about 2 to 18.

18. The bonding composition of claim 1, wherein the bonding composition comprises:
  0.003 to 1.5%-wt. boron in the form of an organoborane;
  25 to 95%-wt. polymerizable monomer; and
  5 to 25%-wt. vinyl aromatic compound according to general formula (1).

19. The bonding composition of claim 1, further including a decomplexer.

20. The bonding composition of claim 19, wherein the organoborane is complexed with a complexing agent selected from the group consisting of amines, amidines, hydroxides, alkoxides, and combinations thereof.

21. The bonding composition of claim 1, wherein the at least one polymerizable monomer is selected from the group consisting of (meth)acrylates, acid amides, and mixtures thereof.

22. The bonding composition of claim 21, wherein the at least one polymerizable monomer is selected from the group consisting (meth)acrylic esters of monohydric alcohols and (meth)acrylic acid esters of polyhydric alcohols.

23. The bonding composition of claim 1, wherein the bonding composition retains at least 90% or greater overlap shear strength at 10 minutes of open time.

24. The bonding composition of claim 1, further including a core-shell polymer.

25. The bonding composition of claim 1, further including a reactive diluent.

26. The bonding composition of claim 1, wherein the bonding composition is a reactive, two-part curable bonding composition comprising:
  (a) a first part comprising:
    an organoborane;
  (b) a second part comprising:
    a polymerizable monomer;
  wherein at least one of the first part or the second part further includes a vinyl aromatic compound according to general formula (1).

27. The bonding composition of claim 26, wherein the first part and the second part are combined in a whole number ratio of about 1:10 to about 1:1.

28. The bonding composition of claim 26, wherein the organoborane is complexed with an amine and the second part further comprises a decomplexer.

29. The bonding composition of claim 26, wherein the first part further includes a vinyl aromatic compound according to general formula (1).

30. A bonded composite comprising a first substrate and a second substrate adhesively bonded together by a layer of a cured bonding composition according to claim 1.

31. The bonded composite of claim 30, wherein at least one of the first and second substrates is a low surface energy polymeric material.

32. The bonded composite of claim 31, wherein the first and second substrates are each independently selected from low surface energy polymeric materials.

33. The bonded composite of claim 31, wherein at least one of the first and second substrates is selected from the group consisting of polyethylene, polypropylene and polytetrafluoroethylene.

34. The bonded composite of claim 32, wherein the first and second substrates are each independently selected from the group consisting of polyethylene, polypropylene and polytetrafluoroethylene.

35. The bonded composite of claim 30, wherein the bonded composite has a T-peel measured in accordance with T-Peel Test Method of about 17.5 N/cm or greater.

36. A bonding composition comprising:
  (i) an organoborane represented by the following general formula:

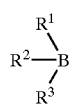

where $R^1$ is an alkyl group having 1 to about 10 carbon atoms;
  $R^2$ and $R^3$ may be the same or different and are independently selected from alkyl groups having 1 to about 10 carbon atoms and phenyl-containing groups;
  (ii) at least one polymerizable monomer; and
  (iii) a vinyl aromatic compound according to general formula (2);

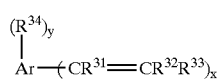

(2)

wherein:

x is an integer having a value of 1 or greater;
y is an integer having a value of 0 or greater;
Ar is a substituted aryl group;
$R^{31}$ is selected from the group consisting of alkyl, aryl and halogen;
$R^{32}$ and $R^{33}$ are independently selected from the group consisting of hydrogen, alkyl, aryl and halogen; and
$R^{34}$ is an organic group wherein each $R^{34}$ is independently selected from the group consisting of alkyl, alkoxy, alkanoyl, alkanoyloxy, aryloxy, aroyl, aroyloxy, and halogen.

37. The bonding composition of claim 36, wherein the vinyl aromatic compound is selected from the group consisting of:

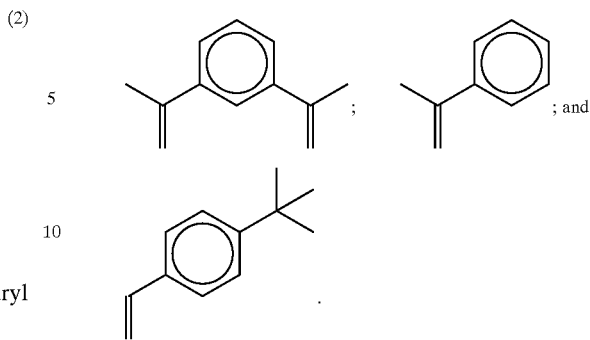

38. The bonding composition of claim 36, wherein the vinyl aromatic compound comprises about 5%-wt. or greater of the bonding composition.

39. The bonding composition of claim 36, further comprising an oligomeric (meth)acrylate.

* * * * *

UNITED STATES PATENT AND TRADEMARK OFFICE
CERTIFICATE OF CORRECTION

PATENT NO.     : 6,479,602 B1
DATED          : November 12, 2002
INVENTOR(S)    : Moren, Dean M.

It is certified that error appears in the above-identified patent and that said Letters Patent is hereby corrected as shown below:

Column 19,
Line 61, "isobomyl" should be -- isobornyl --

Column 29,
Line 27, "Polumerizable" should be -- Polymerizable --

Signed and Sealed this

Thirtieth Day of December, 2003

JAMES E. ROGAN
*Director of the United States Patent and Trademark Office*